United States Patent
Mizusaki et al.

(10) Patent No.: US 11,201,403 B2
(45) Date of Patent: Dec. 14, 2021

(54) LIQUID CRYSTAL CELL AND SCANNING ANTENNA

(71) Applicant: SHARP KABUSHIKI KAISHA, Sakai (JP)

(72) Inventors: Masanobu Mizusaki, Sakai (JP); Kiyoshi Minoura, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 125 days.

(21) Appl. No.: 16/494,686

(22) PCT Filed: Mar. 16, 2018

(86) PCT No.: PCT/JP2018/010387
§ 371 (c)(1),
(2) Date: Nov. 21, 2019

(87) PCT Pub. No.: WO2018/173941
PCT Pub. Date: Sep. 27, 2018

(65) Prior Publication Data
US 2020/0303817 A1      Sep. 24, 2020

(30) Foreign Application Priority Data

Mar. 23, 2017  (JP) .............................. JP2017-057358

(51) Int. Cl.
*H01Q 3/34*     (2006.01)
*H01Q 21/06*    (2006.01)
(Continued)

(52) U.S. Cl.
CPC .............. *H01Q 3/34* (2013.01); *C09K 19/062* (2013.01); *C09K 19/12* (2013.01); *C09K 19/56* (2013.01);
(Continued)

(58) Field of Classification Search
CPC .......... H01Q 3/34; H01Q 15/14; H01Q 21/06; C09K 19/062; C09K 19/12; C09K 19/56;
(Continued)

(56) References Cited

U.S. PATENT DOCUMENTS

| 10,947,416 B2 | 3/2021 | Mizusaki et al. |
| 2007/0273599 A1 | 11/2007 | Haziza |

(Continued)

FOREIGN PATENT DOCUMENTS

| CN | 109642145 A | 4/2019 |
| JP | 2009-538565 A | 11/2009 |

(Continued)

*Primary Examiner* — Ruiyun Zhang
(74) *Attorney, Agent, or Firm* — ScienBiziP, P.C.

(57) ABSTRACT

A liquid crystal cell in which antenna units are arranged includes a TFT substrate, a slot substrate, and a liquid crystal layer. The TFT substrate includes a first dielectric substrate, TFTs supported by the first dielectric substrate and patch electrodes electrically connected to the TFTs, and a first alignment film covering a groove part between the adjacent patch electrodes. The slot substrate includes a second dielectric substrate, a slot electrode including slots and supported by the second dielectric substrate, and a second alignment film covering the slot electrode. The liquid crystal layer sandwiched between the TFT substrate and the slot substrate. The liquid crystal layer includes a liquid crystal material having a lower limit temperature of a nematic phase of the liquid crystal material of −32° C. or lower and an upper limit temperature of the nematic phase of the liquid crystal material of 110° C. or higher.

11 Claims, 14 Drawing Sheets

(51) Int. Cl.
*H01Q 15/14* (2006.01)
*C09K 19/12* (2006.01)
*C09K 19/56* (2006.01)
*C09K 19/06* (2006.01)
*C09K 19/04* (2006.01)

(52) U.S. Cl.
CPC ............. *H01Q 15/14* (2013.01); *H01Q 21/06* (2013.01); *C09K 2019/0448* (2013.01); *C09K 2323/00* (2020.08); *C09K 2323/02* (2020.08); *C09K 2323/027* (2020.08)

(58) Field of Classification Search
CPC ............ C09K 2323/00; C09K 2323/02; C09K 2323/027
USPC ......... 428/1.1, 1.2, 1.25; 342/371, 757, 772, 342/767
See application file for complete search history.

(56) References Cited

U.S. PATENT DOCUMENTS

| | | |
|---|---|---|
| 2008/0036664 A1 | 2/2008 | Haziza |
| 2008/0048922 A1 | 2/2008 | Haziza |
| 2008/0111755 A1 | 5/2008 | Haziza |
| 2008/0117113 A1 | 5/2008 | Haziza |
| 2008/0117114 A1 | 5/2008 | Haziza |
| 2008/0316142 A1 | 12/2008 | Haziza |
| 2009/0058747 A1 | 3/2009 | Haziza |
| 2009/0091500 A1 | 4/2009 | Haziza |
| 2012/0194399 A1 | 8/2012 | Bily et al. |
| 2014/0266946 A1 | 9/2014 | Bily et al. |
| 2015/0229028 A1 | 8/2015 | Bily et al. |
| 2015/0236412 A1 | 8/2015 | Bily et al. |
| 2015/0236415 A1 | 8/2015 | Bily et al. |
| 2016/0359234 A1 | 12/2016 | Bily et al. |
| 2016/0372834 A1 | 12/2016 | Bily et al. |
| 2018/0166780 A1 | 6/2018 | Bily et al. |
| 2019/0194494 A1 | 6/2019 | Mizusaki et al. |
| 2019/0229431 A1* | 7/2019 | Asagi .................... H01L 27/124 |

FOREIGN PATENT DOCUMENTS

| | | |
|---|---|---|
| JP | 2013-539949 A | 10/2013 |
| JP | 2016-512408 A | 4/2016 |
| WO | 2015/126550 A1 | 8/2015 |
| WO | WO-2018038209 A1 * | 3/2018 ......... H01L 27/1255 |

* cited by examiner

LIQUID CRYSTAL CELL AND SCANNING ANTENNA

TECHNICAL FIELD

The present invention relates to a liquid crystal cell and a scanning antenna.

BACKGROUND ART

An antenna used for mobile communication, satellite broadcasting, and the like requires a beam scanning function that can change a beam direction. As the antenna having the above function, a scanning antenna utilizing a large dielectric anisotropy (birefringence) of liquid crystal material (including nematic liquid crystal and polymer dispersed liquid crystal) has been proposed (for example, Patent Documents 1 to 4). This type of scanning antenna has a configuration in which a liquid crystal layer is sandwiched between a pair of electrode-attached substrates (that is, a liquid crystal cell for scanning antenna). In addition, an alignment film for controlling an alignment direction of a liquid crystal compound is provided on a side of the liquid crystal layer of the substrate of the liquid crystal cell.

RELATED ART DOCUMENT

Patent Document

Patent Document 1: Japanese Translation of PCT International Application Publication No. JP-T-2013-539949
Patent Document 2: Japanese Translation of PCT International Application Publication No. JP-T-2016-512408
Patent Document 3: Japanese Translation of PCT International Application Publication No. JP-T-2009-538565
Patent Document 4: WO 2015/126550

Problem to be Solved by the Invention

In the scanning antenna, liquid crystal material having a sufficient level of dielectric constant anisotropy ($\Delta\varepsilon$) in a gigahertz band is required. Therefore, as the liquid crystal material for scanning antenna, the use of an isothiocyanate group-containing liquid crystal compound having high dielectric constant anisotropy is substantially essential. The isothiocyanate group is relatively high in polarity and relatively hydrophilic.

On the other hand, the alignment film in contact with the liquid crystal layer is mainly made of polyimide. The polyimide is relatively hydrophobic and an affinity between the liquid crystal layer and the alignment film can be said to be low. The liquid crystal material constituting the liquid crystal layer potentially contains gas components, although not visible. Such gas components (latent air bubbles) tend to aggregate at an interface between the liquid crystal layer and the alignment film which have low affinity to each other.

In the liquid crystal cell for scanning antenna, a thickness of an electrode is set large (for example, the thickness of the electrode is 1.5 µm or greater) for the purpose of securing antenna characteristics and the like, and accordingly, unevenness in an electrode structure becomes large. Therefore, in the liquid crystal cell, a difference (gap difference) between the most projected portion to a side of the liquid crystal layer and the most recessed portion therefrom becomes large (for example, the difference is about 1.5 µm or greater). In the above liquid crystal cell, there are formed a region in the liquid crystal layer in which a proportion of the liquid crystal material in contact with the alignment film is relatively high and which is easily affected by the alignment film (that is, the region where a thickness of the liquid crystal layer is small), and a region in the liquid crystal layer in which a proportion of the liquid crystal material in contact with the alignment film is relatively low and which is not easily affected by the alignment film (that is, the region where the thickness of the liquid crystal layer is large).

Although the latent air bubbles present in the liquid crystal layer are not visible, the latent air bubbles tend to particularly aggregate at the interface between the liquid crystal layer and the alignment film in the region where the proportion of the liquid crystal material in contact with the alignment film is relatively high (region where the thickness of the liquid crystal layer is small).

When the above liquid crystal cell is subjected to a high-low temperature cycle test (for example, a low temperature is −40° C. and a high temperature is 90° C.), the liquid crystal material is easily solidified at a low temperature to cause the liquid crystal layer to easily discharge the latent air bubbles, and at a high temperature, the gas components (gas molecules) constituting the latent air bubbles expand. Under the environment of alternately switching between a low temperature and a high temperature, the latent air bubbles (gas molecules) discharged from the liquid crystal layer become large due to expansion near the region where the thickness of the liquid crystal layer is small, causing the air bubbles to be generated which are just visible. Such air bubbles in the liquid crystal cell may interfere with the normal operation of the scanning antenna, which has been a problem.

DISCLOSURE OF THE PRESENT INVENTION

An object of the present invention is to provide a liquid crystal cell for scanning antenna in which generation of air bubbles is suppressed, and a scanning antenna using the same.

Means for Solving the Problem

The liquid crystal cell according to the present invention is a liquid crystal cell in which antenna units are arranged. The liquid crystal cell includes: a thin film transistor (TFT) substrate including a first dielectric substrate, TFTs supported by the first dielectric substrate and patch electrodes electrically connected to the TFTs, and a first alignment film formed to cover the patch electrodes and a groove part provided between adjacent ones of the patch electrodes; a slot substrate including a second dielectric substrate, a slot electrode including slots and supported by the second dielectric substrate, and a second alignment film formed to cover the slot electrode; and a liquid crystal layer sandwiched between the TFT substrate and the slot substrate in which the patch electrodes and the slot electrode are arranged to face each other. In the liquid crystal cell, a lower limit temperature T1 of a nematic phase of liquid crystal material constituting the liquid crystal layer is −32° C. or lower, and an upper limit temperature T2 of the nematic phase of the liquid crystal material is 110° C. or higher.

In the liquid crystal cell, the liquid crystal layer preferably has a first region located between each of the patch electrodes and the slot electrode and having small thickness, and a second region located between the groove part and the slot electrode and having large thickness. Further, a difference (D−d) between a thickness d of the liquid crystal layer in the first region and a thickness D of the liquid crystal layer in the second region may be in a range from 0.2 μm to 10.0 μm.

In the liquid crystal cell, a temperature width of the nematic phase of the liquid crystal material is preferably 150° C. or higher.

In the liquid crystal cell, the temperature width of the nematic phase of the liquid crystal material is preferably 160° C. or higher.

In the liquid crystal cell, an absolute value of dielectric constant anisotropy (Δε) of the liquid crystal material may be in a range from 15 to 25.

In the liquid crystal cell, a thickness of the liquid crystal layer in the first region may be in a range from 2.5 μm to 5.5 μm.

In the liquid crystal cell, the liquid crystal material preferably includes a liquid crystal compound including an isothiocyanate group.

In the liquid crystal cell, the liquid crystal compound is preferably made of an isothiocyanate group-containing liquid crystal compound represented by the following chemical formula (1).

[CH1]

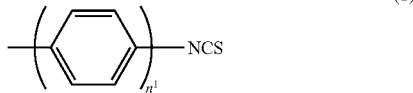

(1)

In the above chemical formula (1), $n^1$ is an integer of 1 to 5, and H in a phenylene group may be substituted by F or Cl.

In the liquid crystal cell, the first alignment film and the second alignment film are preferably made of a polyimide-based resin.

In the liquid crystal cell, an imidization ratio of the polyimide-based resin may be in a range from 40% to 95%.

In the liquid crystal cell, a thickness of the first alignment film in contact with the liquid crystal layer in the second region may be in a range from twice to 10 times greater than a thickness of the first alignment film in contact with the liquid crystal layer in the first region.

Further, in the scanning antenna according to the present invention, the liquid crystal cell includes the liquid crystal cell according to any one paragraph of the above, and a reflective conductive plate arranged to face an outer main surface of the second dielectric substrate of the liquid crystal cell, with a dielectric layer interposed between the reflective conductive plate and the second dielectric substrate.

Advantageous Effect of the Invention

According to the present invention, it is possible to provide a liquid crystal cell for a scanning antenna in which the generation of air bubbles is suppressed, and a scanning antenna using the same.

MODES FOR CARRYING OUT THE INVENTION

First Embodiment

Basic Structure of Scanning Antenna

A scanning antenna has a beam scanning function that can change a beam direction, and has a structure including antenna units utilizing an anisotropy (birefringence) of a large dielectric constant M (εM) of liquid crystal material. The scanning antenna controls a voltage applied to a liquid crystal layer of each antenna unit, and changes the effective dielectric constant M (εM) of the liquid crystal layer of each antenna unit, thereby forming a two-dimensional pattern with antenna units having different capacitance. Note that, because the dielectric constant of the liquid crystal material has frequency dispersion, in the present description, the dielectric constant in the microwave frequency band is particularly referred to as "dielectric constant M (εM)".

Electromagnetic waves (for example, microwaves) emitted from the scanning antenna or received by the scanning antenna are given a phase difference corresponding to the capacitance of each antenna unit, and corresponding to the two-dimensional pattern formed by antenna units having different capacitance, the electromagnetic waves have strong directivity in a specific direction (beam scanning). For example, the electromagnetic waves emitted from the scanning antenna are obtained by integrating spherical waves obtained as a result of input electromagnetic waves being incident in each antenna unit and scattered in each antenna unit, by taking into consideration the phase difference given by each antenna unit.

Figure 1:
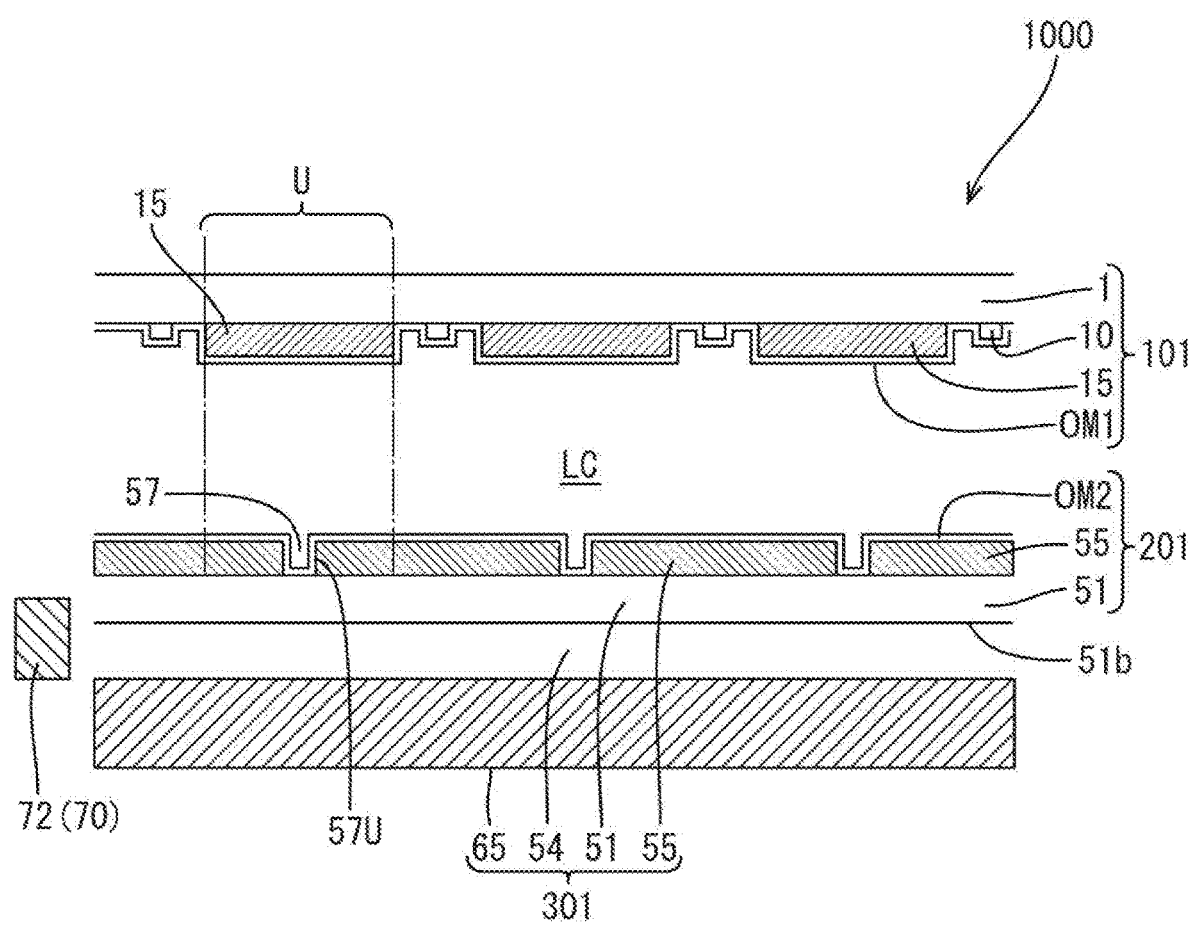
FIG. 1 is a cross-sectional view schematically showing a part of a scanning antenna according to a first embodiment.

Here, a basic structure of a scanning antenna according to one embodiment of the present invention is described with reference to FIG. 1 and the like. FIG. 1 is a cross-sectional view schematically showing a part of the scanning antenna 1000 according to a first embodiment. The scanning antenna 1000 of the present embodiment is a radial inline slot antenna in which slots 57 are arranged concentrically. FIG. 1 schematically shows a part of a cross section along a radial direction from a power feed pin 72 provided in a vicinity of a center of the concentrically arranged slots. Note that in other embodiments, arrangement of the slots may be various known arrangements (such as spiral shape and matrix shape).

The scanning antenna 1000 mainly includes a TFT substrate 101 (an example of a first substrate), a slot substrate 201 (an example of a second substrate), a liquid crystal layer LC arranged therebetween, and a reflective conductive plate 65. The scanning antenna 1000 is configured to transmit and receive the microwaves from a side of the TFT substrate 101. The TFT substrate 101 and the slot substrate 201 are arranged to face each other with the liquid crystal layer LC interposed therebetween.

The TFT substrate 101 (an example of a first substrate) includes a dielectric substrate 1 (an example of a first dielectric substrate) such as a glass substrate, patch electrodes 15 and TFTs (thin film transistors) 10 formed on a side of the liquid crystal layer LC of the dielectric substrate 1, and an alignment film OM1 (an example of a first alignment film) formed on the outermost surface on the side of the liquid crystal layer LC. Each TFT 10 is connected with a gate bus line and a source bus line not shown in FIG. 1.

The slot substrate 201 (an example of a second substrate) includes a dielectric substrate 51 (an example of a second dielectric substrate) such as a glass substrate, a slot electrode 55 formed on the side of the liquid crystal layer LC of the dielectric substrate 51, and an alignment film OM2 (an example of a second alignment film) formed on the outermost surface on the side of the liquid crystal layer LC. The slot electrode 55 is provided with the slots 57. A surface on the side of the liquid crystal layer LC of the dielectric substrate 51 is referred to as a first main surface, and a surface on the opposite side thereto is referred to as a second main surface.

The dielectric substrates 1, 51 used for the TFT substrate 101 and the slot substrate 201 preferably have a small dielectric loss to microwaves, and a plastic substrate can be used other than the glass substrate. A thickness of the dielectric substrates 1, 51 is not particularly limited, but is preferably 400 µm or less, and more preferably 300 µm or less, for example. The lower limit of the thickness of the dielectric substrates 1, 51 is not particularly limited as long as the dielectric substrates have a strength that can withstand in a production process or the like.

The reflective conductive plate 65 is arranged to face the slot substrate 201 with an air layer 54 interposed therebetween. That is, the reflective conductive plate 65 is arranged to face the second main surface of the dielectric substrate 51 (an example of the second dielectric substrate) of the slot substrate 201 with the air layer 54 (dielectric layer) interposed therebetween. In other embodiments, instead of the air layer 54, a layer formed of a dielectric having a small dielectric constant M to microwaves (for example, a fluorine resin such as polytetrafluoroethylene (PTFE)) may be used.

In the scanning antenna 1000 of the present embodiment, the slot electrode 55, the reflective conductive plate 65, and the dielectric substrate 51 and the air layer 54 between the above two function as a waveguide 301.

The patch electrodes 15, a portion of the slot electrode 55 including the slots 57 (hereinafter may be referred to as a "slot electrode unit 57U"), and the liquid crystal layer LC between the above two constitute an antenna unit U. In each antenna unit U, one island-shaped patch electrode 15 faces one hole-shaped slot 57 (slot electrode unit 57U) with the liquid crystal layer LC interposed therebetween, to constitute a liquid crystal capacitance. In the scanning antenna 1000 of the present embodiment, the antenna units U are arranged concentrically. The antenna unit U includes an auxiliary capacitance electrically connected in parallel to the liquid crystal capacitance.

The slot electrode 55 constitutes the antenna unit U in each slot electrode unit 57U and also functions as a wall of the waveguide 301. Therefore, the slot electrode 55 needs to have a function of suppressing transmission of microwaves, and is formed of a relatively thick metal layer. As the metal layer described above, for example, a copper (Cu) layer, an aluminum (Al) layer, and the like are mentioned. For example, in order to reduce the microwave of 10 GHz to 1/150, a thickness of the Cu layer is set to 3.3 µm or greater, and a thickness of the Al layer is set to 4.0 µm or greater. Also, in order to reduce the microwave of 30 GHz to 1/150, the thickness of the Cu layer is set to 1.9 µm or greater, and the thickness of the Al layer is set to 2.3 µm or greater. An upper limit of the thickness of the metal layer constituting the slot electrode 55 is not particularly limited, but in consideration of forming the alignment film OM2, it is can be said that the metal layer is preferably as thin as possible. When the Cu layer is used as the metal layer, there is an advantage that the layer can be made thinner than the Al layer. As a method of forming the slot electrode 55, a thin film deposition method used in the conventional liquid crystal display device technology, or another method such as affixing a metal foil (for example, a Cu foil or Al foil) on a substrate may be used. The thickness of the slot electrode 55 may be set in a range from 1.5 µm to 30 µm, preferably, from 1.5 µm to 5 µm. When the thin film deposition method is used to form the metal layer, the thickness of the slot electrode 55 may be set to 5 µm or less. As the reflective conductive plate 65, for example, an aluminum plate, copper plate, or the like having a thickness of several mm can be used.

Unlike the slot electrode 55, the patch electrodes 15 do not constitute the waveguide 301, and accordingly, may be formed of a metal layer thinner than the slot electrode 55 as long as the object of the present invention is not impaired. In order to avoid a loss caused when vibration of free electrons in the vicinity of the slots 57 of the slot electrode 55 induces vibration of free electrons in the patch electrodes 15 and is converted to heat, a resistance is preferably low. From a viewpoint of mass productivity and the like, the Al layer is preferably used rather than the Cu layer. A thickness of the patch electrodes 15 may be in a range from 0.5 µm to 10 µm, more preferably, from 1.5 µm to 5 µm.

An arrangement pitch of the antenna unit U is set to, for example, $\lambda/4$ or less, and/or $\lambda/5$ or less, where $\lambda$ is a wavelength of the microwave as described in Patent Document 1. The wavelength $\lambda$ is, for example, 25 mm, and the arrangement pitch in that case is set, for example, to 6.25 mm or less, and/or 5 mm or less.

The scanning antenna 1000 changes a phase of the microwave excited (re-radiated) from each patch electrode 15 by changing a capacitance value of the liquid crystal capacitance that the antenna unit U has. Therefore, as the liquid crystal layer LC, the anisotropy ($\Delta\varepsilon M$) of the dielectric constant M ($\varepsilon M$) to microwaves is preferably large, and tan $\delta M$ (dielectric loss tangent to microwaves) is preferably small.

Although the dielectric constant of the liquid crystal material generally has frequency dispersion, the dielectric anisotropy $\Delta\varepsilon M$ to microwaves has a positive correlation with a refractive index anisotropy $\Delta n$ to the visible light. Therefore, the liquid crystal material for the antenna unit for microwaves is preferably material having a large refractive index anisotropy $\Delta n$ to the visible light. The thickness of the liquid crystal layer LC may be set in a range from 1 µm to 500 µm, preferably, from 2 µm to 10 µm, more preferably, from 2.5 µm to 5.5 µm. Note that the thickness of the liquid crystal layer LC is the thickness of the liquid crystal layer LC between the slot electrode 55 and the patch electrode 15 (thickness of the liquid crystal layer LC in a first region S1 described later).

Figure 2:
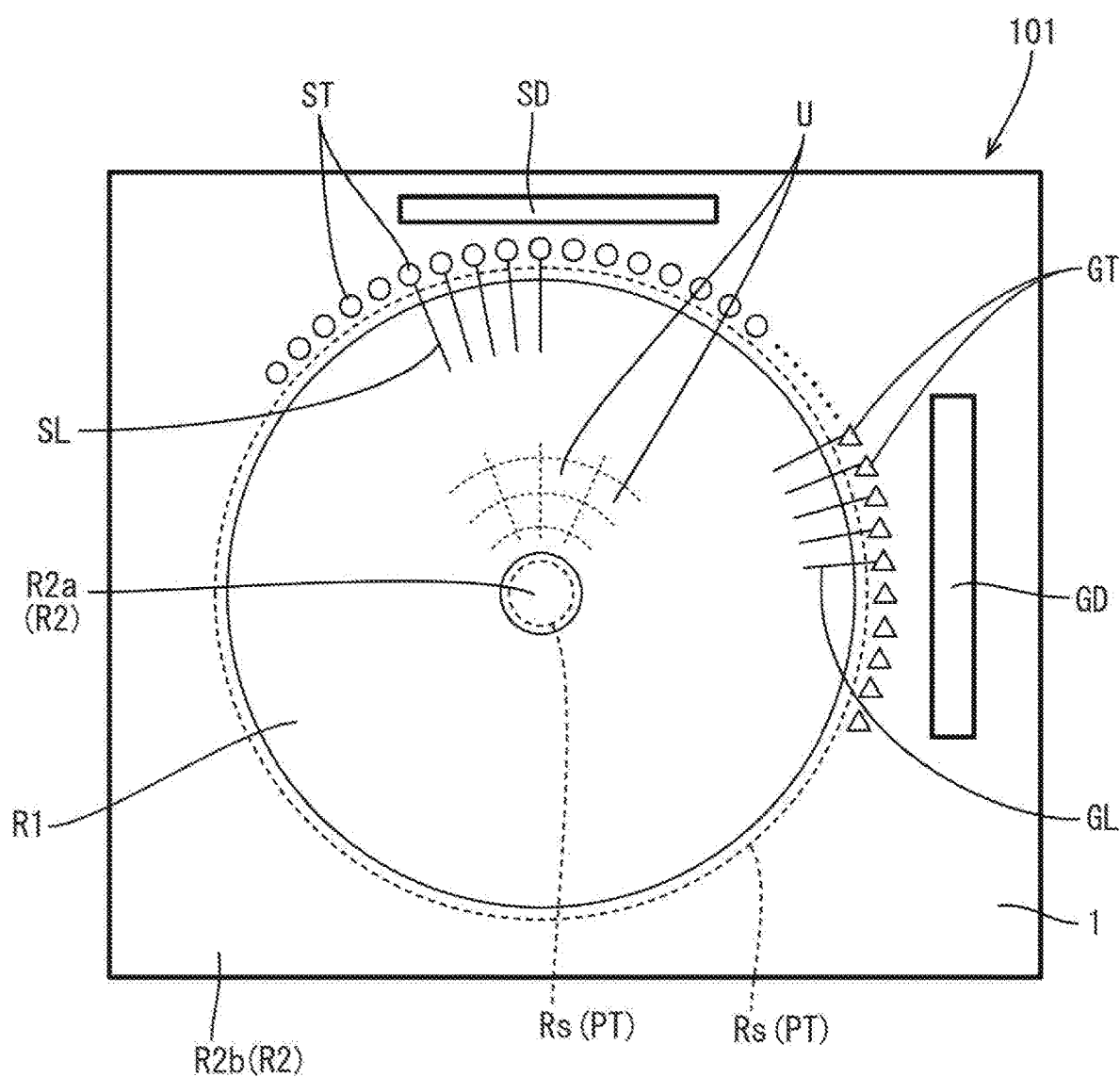
FIG. 2 is a plan view schematically showing a TFT substrate provided in the scanning antenna.
Figure 3:
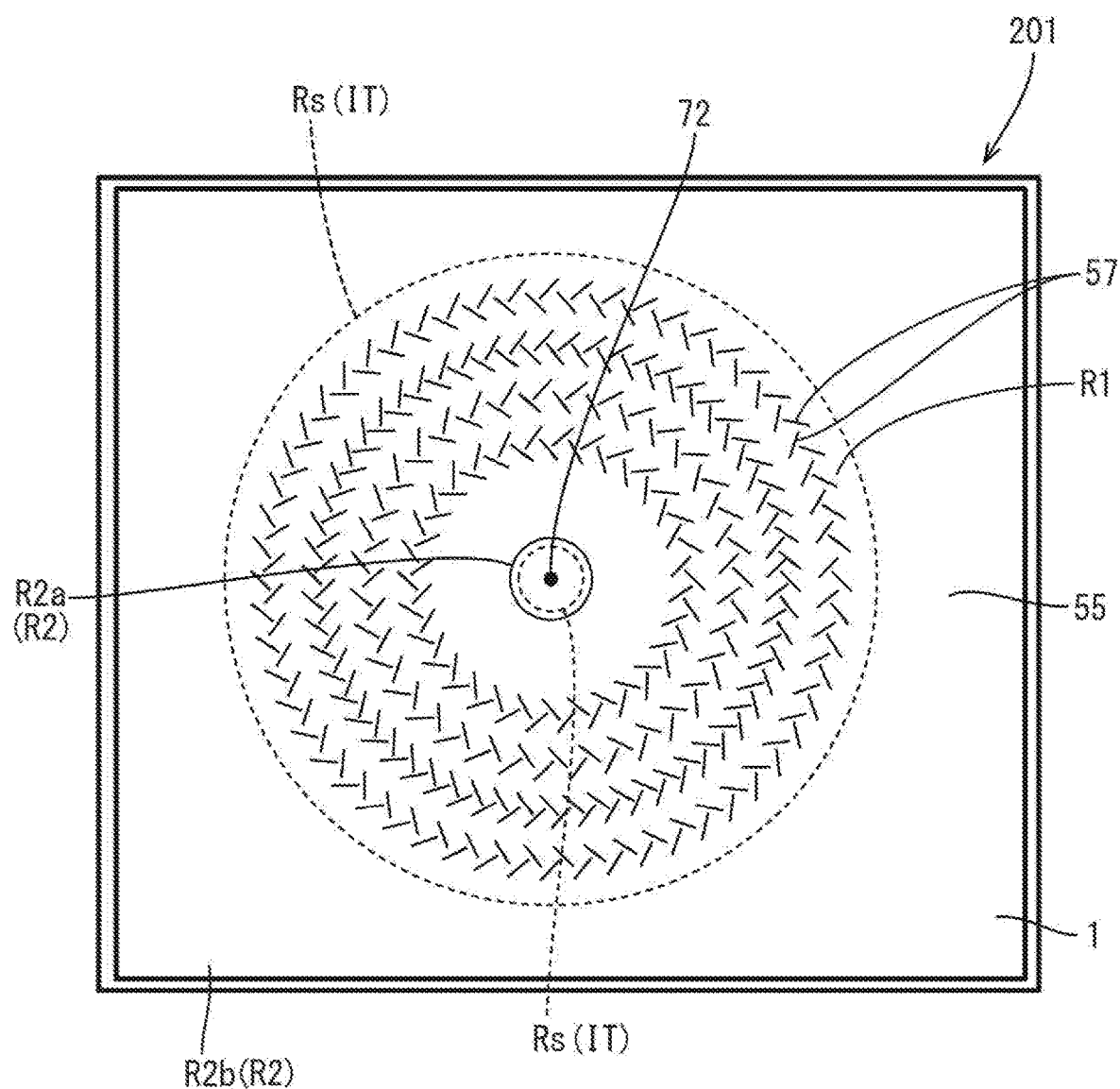
FIG. 3 is a plan view schematically showing a slot substrate provided in the scanning antenna.

FIG. 2 is a plan view schematically showing the TFT substrate 101 provided in the scanning antenna 1000, and FIG. 3 is a plan view schematically showing the slot substrate 201 provided in the scanning antenna 1000. A region of the TFT substrate 101 and a region of the slot substrate 201 corresponding to the antenna unit U are both referred to as "antenna unit region" for convenience of explanation, and the same reference symbol as that of the antenna unit is referred to as the reference symbols thereof. Further, as shown in FIGS. 2 and 3, in the TFT substrate 101 and the slot substrate 201, a region defined by the two-dimensionally arranged antenna unit regions U is referred to as "transmission/reception region R1", and a region other than the transmission/reception region R1 is referred to as "non-transmission/reception region R2". A terminal part, a drive circuit, and the like are provided in the non-transmission/reception region R2.

The transmission/reception region R1 has an annular shape in plan view. The non-transmission/reception region R2 includes a first non-transmission/reception region R2a located at a center part of the transmission/reception region R1 and a second non-transmission/reception region R2b arranged at a periphery of the transmission/reception region R1. An outer diameter of the transmission/reception region R1 may be set in a range from 200 mm to 1,500 mm where appropriate depending on an amount of communication and the like.

Gate bus lines GL and source bus lines SL supported by the derivative substrate 1 are provided in the transmission/reception region R1 of the TFT substrate 101, and driving of each antenna unit region U is controlled using the above lines. Each antenna unit region U includes the TFT 10 and the patch electrode 15 electrically connected to the TFT 10. A source electrode of the TFT 10 is electrically connected to the source bus line SL, and a gate electrode is electrically connected to the gate bus line GL. A drain electrode of the TFT 10 is electrically connected to the patch electrode 15.

In the non-transmission/reception region R2 (first non-transmission/reception region R2a, second non-transmission/reception region R2b), seal regions Rs are arranged in which a sealing material (not shown) are formed to surround the transmission/reception region R1. The sealing material has a function of causing the TFT substrate 101 and the slot substrate 201 to adhere to each other and also sealing the liquid crystal material (liquid crystal layer LC) between the substrates 101, 201.

Gate terminal parts GT, a gate driver GD, source terminal parts ST, and a source driver SD are arranged outside the seal region R2 among the non-transmission/reception region R2. Each gate bus line GL is connected to the gate driver GD via each gate terminal part GT, and each source bus line SL is connected to the source driver SD via each source terminal part ST. In the present embodiment, both the source driver SD and the gate driver GD are formed on the dielectric substrate 1 of the TFT substrate 101. However, one or both of the drivers may be formed on the dielectric substrate 51 of the slot substrate 201.

Transfer terminal parts PT are provided in the non-transmission/reception region R2. The transfer terminal parts PT are electrically connected to the slot electrode 55 of the slot substrate 201. In the present embodiment, the transfer terminal parts PT are arranged in both the first non-transmission/reception region R2a and the second non-transmission/reception region R2b. In other embodiments, the transfer terminal part PT may be configured to be arranged in only one of the regions. Further, in the case of the present embodiment, the transfer terminal parts PT are respectively arranged in the seal regions Rs. Therefore, a conductive resin containing conductive particles (conductive beads) is used as the sealing material.

As shown in FIG. 3, in the slot substrate 201, the slot electrode 55 is formed on the dielectric substrate 51 to extend over the transmission/reception region R1 and the non-transmission/reception region R2. Note that FIG. 3 shows a surface of the slot substrate 201 as viewed from the side of the liquid crystal layer LC, and the alignment film OM2 formed on the outermost surface is removed for the convenience of explanation.

In the transmission/reception region R1 of the slot substrate 201, the slots 57 are provided in the slot electrode 55. These slots 57 are allocated one by one to the antenna unit region U of the TFT substrate 101. In the case of the present embodiment, the slots 57 are arranged such that a pair of slots 57 extending in directions substantially orthogonal to each other is concentrically arranged to constitute a radial inline slot antenna. With the pair of slots 57 described above, the scanning antenna 1000 can transmit and receive circularly polarized waves.

Terminal parts IT of the slot electrode 55 are provided in the non-transmission/reception region R2 of the slot substrate 201. The terminal parts IT are electrically connected to the transfer terminal parts PT of the TFT substrate 101. In the case of the present embodiment, the terminal parts IT are respectively arranged in the seal regions Rs, and as described above, are electrically connected to the corresponding transfer terminal parts PT by the sealing material made of the conductive resin containing the conductive particles (conductive beads).

In the first non-transmission/reception region R2a, the power feed pin 72 is provided at the center of a concentric circle formed by the slots 57. The power feed pin 72 supplies the microwaves to the waveguide 301 constituted of the slot electrode 55, the reflective conductive plate 65, and the dielectric substrate 51. The power feed pin 72 is connected to a power feed device 70. The feeding method may be either a direct feeding method or an electromagnetic coupling method, and a known feeding structure can be adopted.

The TFT substrate 101, the slot substrate 201, and the waveguide 301 are described in detail below.

Structure of TFT Substrate 101

Figure 4:
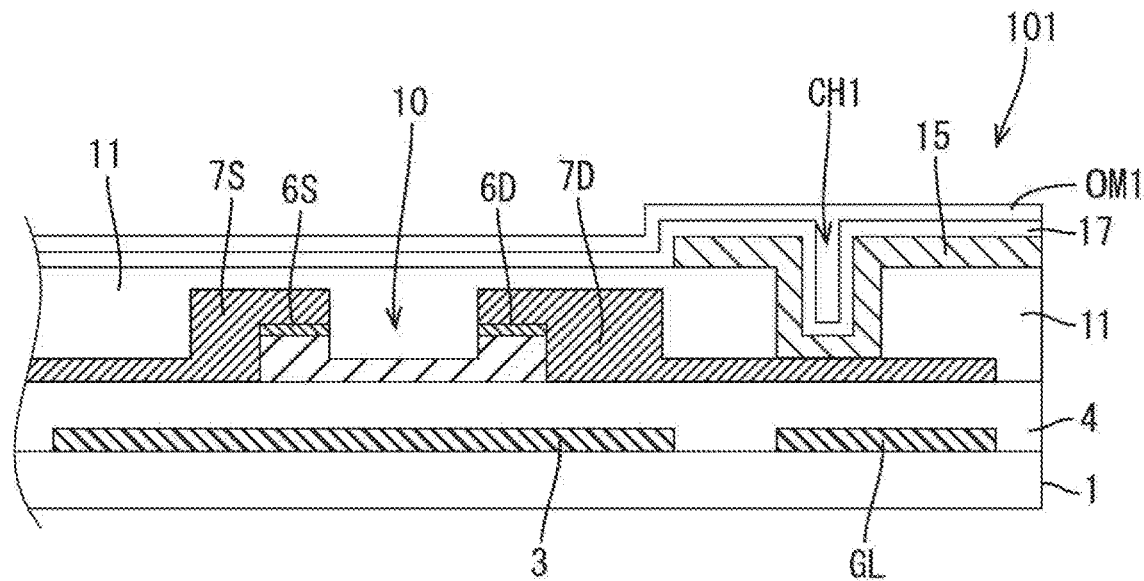
FIG. 4 is a cross-sectional view schematically showing an antenna unit region of the TFT substrate.
Figure 5:
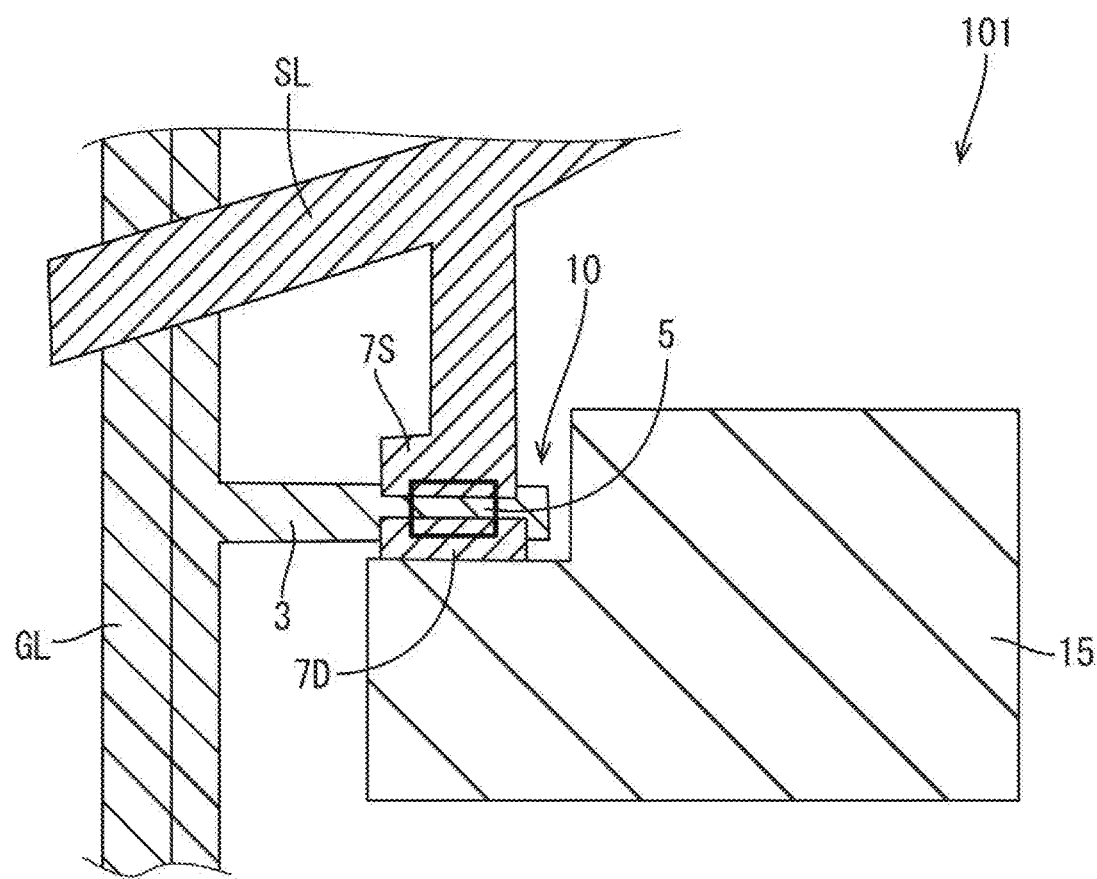
FIG. 5 is a plan view schematically showing the antenna unit region of the TFT substrate.

FIG. 4 is a cross-sectional view schematically showing the antenna unit region U of the TFT substrate 101, and FIG. 5 is a plan view schematically showing the antenna unit region U of the TFT substrate 101. FIGS. 4 and 5 each show a cross-sectional configuration of a part of the transmission/reception region R1.

Each antenna unit region U of the TFT substrate 101 includes the dielectric substrate 1 (first dielectric substrate), the TFT 10 supported by the dielectric substrate 1, a first insulating layer 11 covering the TFT 10, the patch electrode 15 formed on the first insulating layer 11 and electrically connected to the TFT 10, a second insulating layer 17 covering the patch electrode 15, and the alignment film OM1 covering the second insulating layer 17.

The TFT 10 includes a gate electrode 3, an island-shaped semiconductor layer 5, a gate insulating layer 4 arranged between the gate electrode 3 and the semiconductor layer 5, a source electrode 7S, and a drain electrode 7D. The TFT 10 of the present embodiment is a channel etch type TFT having a bottom gate structure. In other embodiments, TFTs having other structures may be used.

The gate electrode 3 is electrically connected to the gate bus line GL, and a scan signal is supplied from the gate bus line GL. The source electrode 7S is electrically connected to the source bus line SL, and a data signal is supplied from the source bus line SL. The gate electrode 3 and the gate bus line GL may be formed of the same conductive film (gate conductive film). Further, the source electrode 7S, the drain electrode 7D, and the source bus line SL may be formed of the same conductive film (source conductive film). The gate conductive film and the source conductive film are made of, for example, a metal film. Note that a layer formed using the gate conductive film may be referred to as "gate metal layer", and a layer formed using the source conductive film may be referred to as "source metal layer".

The semiconductor layer 5 is arranged to overlap with the gate electrode 3 with the gate insulating layer 4 interposed therebetween. As shown in FIG. 4, a source contact layer 6S and a drain contact layer 6D are formed on the semiconductor layer 5. The source contact layer 6S and the drain contact layer 6D are arranged in a manner of facing each other on both sides of a region in the semiconductor layer 5 in which a channel is to be formed (channel region). In the case of the present embodiment, the semiconductor layer 5 is made of an intrinsic amorphous silicon (i-a-Si) layer, and the source contact layer 6S and the drain contact layer 6D are made of $n^+$ type amorphous silicon ($n^+$-a-Si) layers. In other embodiments, the semiconductor layer 5 may be formed of a polysilicon layer, an oxide semiconductor layer, or the like.

The source electrode 7S is provided to be in contact with the source contact layer 6S, and is connected to the semiconductor layer 5 via the source contact layer 6S. The drain electrode 7D is provided to be in contact with the drain contact layer 6D, and is connected to the semiconductor layer 5 via the drain contact layer 6D.

The first insulating layer 11 includes a contact hole CH1 reaching the drain electrode 7D of the TFT 10.

The patch electrode 15 is provided on the first insulating layer 11 and in the contact hole CH1, and is in contact with the drain electrode 7D in the contact hole CH1. The patch electrode 15 is mainly constituted of a metal layer. The patch electrode 15 may be a metal electrode formed only of the metal layer. Material of the patch electrode 15 may be the same as that of the source electrode 7S and the drain electrode 7D. A thickness of the metal layer in the patch electrode 15 (thickness of the patch electrode 15 when the patch electrode 15 is the metal electrode) may be the same as but preferably larger than a thicknesses of the source electrode 7S and the drain electrode 7D. When the thickness of the patch electrode 15 is large, a transmittance of the electromagnetic wave is suppressed low, a sheet resistance of the patch electrode is reduced, and a loss caused when vibration of free electrons in the patch electrode is converted to heat is reduced.

In addition, a capacitive (CS) bus line CL may be provided using the same conductive film as the gate bus line GL. The CS bus line CL is arranged to overlap with the drain electrode 7D (or an extended portion of the drain electrode 7D) with the gate insulating layer 4 interposed therebetween, and may constitute an auxiliary capacitance CS including the gate insulating layer 4 as a dielectric layer.

In the present embodiment, the patch electrode 15 is formed in a layer different from the source metal layer. Therefore, the thickness of the source metal layer and the thickness of the patch electrode 15 can be controlled independently of each other.

The patch electrode 15 may include a Cu layer or Al layer as a main layer. The performance of the scanning antenna is correlated with the electrical resistance of the patch electrode 15, and a thickness of the main layer is set such that a desired resistance is obtained. The patch electrode 15 preferably has a low resistance to the extent of not inhibiting the vibration of electrons. For example, a thickness of the patch electrodes 15 may be set in a range from 0.5 m to 10 μm, more preferably, from 1.5 μm to 5 μm. The thickness of the patch electrode 15 is preferably 1.5 μm or greater from the viewpoint of improvement of antenna characteristics and the like.

The alignment film OM1 is made of a polyimide-based resin. Details of the alignment film OM1 is described later.

The TFT substrate 101 is produced, for example, by a method shown below. First, the dielectric substrate 1 is prepared. As the derivative substrate 1, for example, a glass substrate, a plastic substrate having heat resistance, or the like can be used. The gate metal layer including the gate electrode 3 and the gate bus line GL is formed on the dielectric substrate 1.

The gate electrode 3 can be integrally formed with the gate bus line GL. Here, the gate conductive film (with a thickness in a range from 50 nm to 500 nm) is formed on the dielectric substrate 1 by a sputtering method or the like. Next, the gate electrode 3 and the gate bus line GL are formed by patterning the gate conductive film. Material of the gate conductive film is not particularly limited, but for example, a film containing a metal such as aluminum (Al), tungsten (W), molybdenum (Mo), tantalum (Ta), chromium (Cr), titanium (Ti), copper (Cu), or a metal alloy thereof, or a metal nitride thereof can be used as appropriate. Here, a stacked film is formed by stacking molybdenum nitride (MoN, thickness of, for example, 50 nm), Al (thickness of, for example, 200 nm), and MoN (thickness of, for example, 50 nm) in this order as the gate conductive film.

Next, the gate insulating layer 4 is formed to cover the gate metal layer. The gate insulating layer 4 can be formed by a chemical vapor deposition (CVD) method or the like. As the gate insulating layer 4, a silicon oxide ($SiO_2$) layer, a silicon nitride (SiNx) layer, a silicon oxynitride (SiOxNy; x>y) layer, a silicon nitride oxide (SiNxOy; x>y) layer, or the like can be suitably used. The gate insulating layer 4 may have a stacked structure. Here, the SiNx layer (thickness of, for example, 410 nm) is formed as the gate insulating layer 4.

Next, the semiconductor layer 5 and a contact layer are formed on the gate insulating layer 4. Here, the intrinsic amorphous silicon film (thickness of, for example, 125 nm) and the n+ type amorphous silicon film (thickness of, for example, 65 nm) are formed in this order and are patterned to obtain the island-shaped semiconductor layer 5 and the contact layer. The semiconductor film used for the semiconductor layer 5 is not limited to the amorphous silicon film. For example, an oxide semiconductor layer may be formed as the semiconductor layer 5. In this case, the contact layer may not be provided between the semiconductor layer 5 and the source and drain electrodes.

Then, the source conductive film (with a thickness in a range from 50 nm to 500 nm) is formed on the gate insulating layer 4 and the contact layer, and is patterned to form the source metal layer including the source electrode 7S, the drain electrode 7D and the source bus line SL. At this time, the contact layer is also etched to form the source contact layer 6S and the drain contact layer 6D which are separated from each other.

Material of the source conductive film is not particularly limited, and a film containing a metal such as aluminum (Al), tungsten (W), molybdenum (Mo), tantalum (Ta), chromium (Cr), titanium (Ti), copper (Cu), or a metal alloy thereof, or a metal nitride thereof can be used as appropriate, for example. Here, a stacked film is formed by stacking MoN (thickness of, for example, 30 nm), Al (thickness of, for example, 200 nm), and MoN (thickness of, for example, 50 nm) in this order as the source conductive film.

Here, for example, the source conductive film is formed by the sputtering method, and is patterned (source/drain separated) by wet etching. Thereafter, a portion of the contact layer located on a region to be the channel region of the semiconductor layer 5 is removed by, for example, dry etching, to form a gap part and to separate the contact layer into the source contact layer 6S and the drain contact layer 6D. At this time, in the gap part, a vicinity of a surface of the semiconductor layer 5 is also etched (over-etched).

Next, the first insulating layer 11 is formed to cover the TFT 10. In this example, the first insulating layer 11 is arranged to be in contact with the channel region of the semiconductor layer 5. Further, the contact hole CH1 reaching the drain electrode 7D is formed in the first insulating layer 11 by a known photolithography technique.

The first insulating layer 11 may be, for example, an inorganic insulating layer such as a silicon oxide (SiO$_2$) film, a silicon nitride (SiNx) film, a silicon oxynitride (SiOxNy; x>y) film, or a silicon nitride oxide (SiNxOy; x>y) film. Here, the SiNx layer having a thickness of, for example, 330 nm is formed as the first insulating layer 11 by, for example, the CVD method.

Next, a patch conductive film is formed on the first insulating layer 11 and in the contact hole CH1, and is patterned. Thereby, the patch electrode 15 is formed in the transmission/reception region R1. In the non-transmission/reception region R2, a patch connection part made of the same conductive film (patch conductive film) as the patch electrode 15 is formed. The patch electrode 15 is in contact with the drain electrode 7D in the contact hole CH1.

As material of the patch conductive film, the same material as the gate conductive film or source conductive film can be used. However, the patch conductive film is preferably set to be thicker than the gate conductive film and the source conductive film.

Here, a stacked film (MoN/Al/MoN) is formed by stacking MoN (thickness of, for example, 50 nm), Al (thickness of, for example, 1000 nm), and MoN (thickness of, for example, 50 nm) in this order as the patch conductive film.

Next, the second insulating layer 17 (with a thickness in a range from 100 nm to 300) is formed on the patch electrode 15 and the first insulating layer 11. The second insulating layer 17 is not particularly limited, and for example, a silicon oxide (SiO$_2$) film, a silicon nitride (SiNx) film, a silicon oxynitride (SiOxNy; x>y) film, a silicon nitride oxide (SiNxOy; x>y) film, or the like can be suitably used. Here, the SiNx layer having a thickness of, for example, 200 nm is formed as the second insulating layer 17.

After that, the inorganic insulating films (the second insulating layer 17, the first insulating layer 11, and the gate insulating layer 4) are collectively etched by dry etching using, for example, a fluorine-based gas. In the etching, the patch electrode 15, the source bus line SL and the gate bus line GL function as an etch stop. As a result, a second contact hole reaching the gate bus line GL is formed in the second insulating layer 17, the first insulating layer 11, and the gate insulating layer 4, and a third contact hole reaching the source bus line SL is formed in the second insulating layer 17 and the first insulating layer 11. Further, a fourth contact hole reaching the patch connection part described above is formed in the second insulating layer 17.

Next, a conductive film (with a thickness in a range from 50 nm to 200 nm) is formed on the second insulating layer 17, and in the second contact hole, the third contact hole, and the fourth contact hole by, for example, the sputtering method. As the conductive film, for example, a transparent conductive film such as an indium tin oxide (ITO) film, an indium zinc oxide (IZO) film, or a zinc oxide film (ZnO film) can be used. Here, the ITO film having a thickness of, for example, 100 nm is used as the conductive film.

Then, the transparent conductive film is patterned to form a gate terminal upper connection part, a source terminal upper connection part, and a transfer terminal upper connection part. The gate terminal upper connection part, the source terminal upper connection part, and the transfer terminal upper connection part are used to protect an exposed electrode or line at each terminal part. As described above, the gate terminal part GT, the source terminal part ST, and the transfer terminal part PT are obtained.

Next, the alignment film OM1 is formed to cover the second insulating film 17 and the like. Details of the alignment film OM1 is described later. Thus, the TFT substrate 101 can be produced.

Structure of Slot Substrate 201

Figure 6:
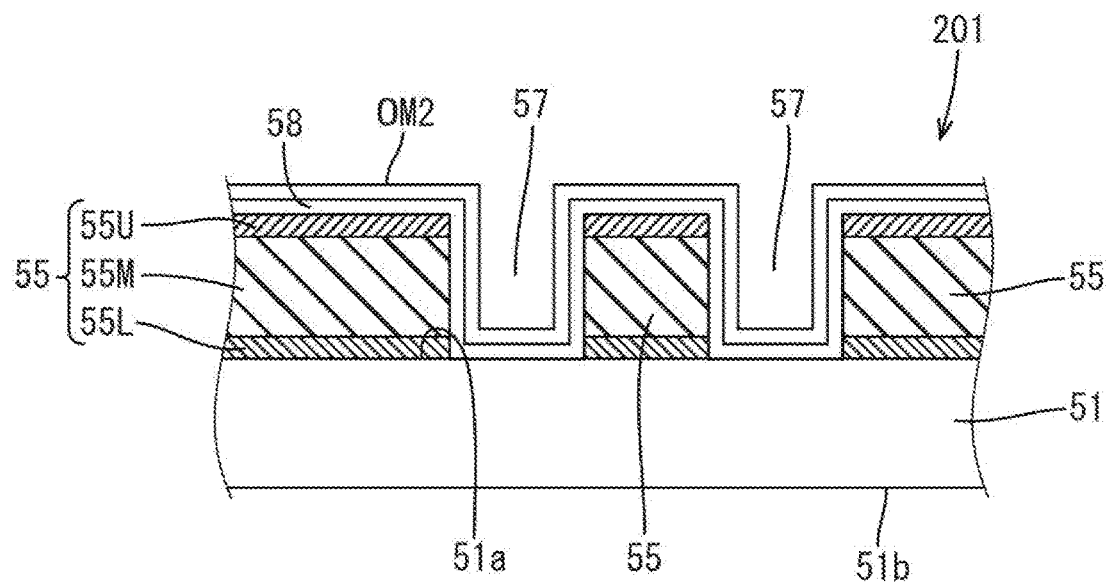
FIG. 6 is a cross-sectional view schematically showing an antenna unit region of the slot substrate.

Next, a structure of the slot substrate 201 is described more specifically. FIG. 6 is a cross-sectional view schematically showing the antenna unit region U of the slot substrate 201.

The slot substrate 201 mainly includes the dielectric substrate 51 (second dielectric substrate) and the slot electrode 55 formed on one plate surface 51a (plate surface facing the side of the liquid crystal layer and the side of the TFT substrate 101) of the dielectric substrate 51, a third insulating layer 58 covering the slot electrode 55, and the alignment film OM2 covering the third insulating layer 58.

In the transmission/reception region R1 of the slot substrate 201, the slots 57 are formed in the slot electrode 55 (see FIG. 2). The slots 57 are openings (groove parts) penetrating through the slot electrode 55. In this example, one slot 57 is allocated to each antenna unit region U.

The slot electrode 55 includes a main layer 55M such as a Cu layer or an Al layer. The slot electrode 55 may have a stacked structure including the main layer 55M, and an upper layer 55U and a lower layer 55L arranged to sandwich the main layer 55M. A thickness of the main layer 55M may be set, in consideration of the skin effect depending on material, in a range from 2 μm to 30 μm. The thickness of the main layer 55M is typically set larger than thicknesses of the upper layer 55U and the lower layer 55L.

In this example, the main layer 55M is a Cu layer, and the upper layer 55U and the lower layer 55L are titanium (Ti) layers. By arranging the lower layer 55L between the main layer 55M and the dielectric substrate 51, adhesion between the slot electrode 55 and the dielectric substrate 51 can be improved. Further, by providing the upper layer 55U, corrosion of the main layer 55M (for example, the Cu layer) can be suppressed.

The third insulating layer 58 is formed on the slot electrode 55 and in the slots 57. Material of the third insulating layer 52 is not particularly limited, and for example, a silicon oxide ($SiO_2$) film, a silicon nitride (SiNx) film, a silicon oxynitride (SiOxNy; x>y) film, a silicon nitride oxide (SiNxOy; x>y) film, or the like is suitably used.

Similarly to the alignment film OM1 of the TFT substrate 101, the alignment film OM2 is made of a polyimide-based resin. Details of the alignment film OM2 is described later.

In each of the non-transmission/reception regions R2 of the slot substrate 201, the terminal part IT is provided (see FIG. 3). The terminal part IT includes a part of the slot electrode 55, the third insulating layer 58 covering a part of the slot electrode 55, and an upper connection part. The third insulating layer 58 has an opening (contact hole) reaching a part of the slot electrode 55. The upper connection part is in contact with a part of the slot electrode 55 in the opening. In the present embodiment, the terminal part IT is formed of a conductive layer such as an ITO film or an IZO film, is arranged in the seal region Rs, and is connected to the transfer terminal part PT of the TFT substrate 101 by a sealing resin containing conductive particles (for example, conductive beads such as gold (Au) beads).

The slot substrate 201 is produced, for example, by a method shown below. First, the dielectric substrate 51 is prepared. As the dielectric substrate 51, a substrate having high transmittance to electromagnetic waves (small dielectric constant εM and dielectric loss tan δM) such as a glass substrate and a resin substrate can be used. The dielectric substrate 51 preferably has a small thickness in order to suppress the attenuation of the electromagnetic waves. For example, after components such as the slot electrode 55 are formed on a surface of the glass substrate by a process described later, the glass substrate may be thinned from a back surface side. Thereby, the thickness of the glass substrate can be set to, for example, 500 μm or less. In general, the dielectric constant εM and the dielectric loss tan δM are smaller in resin than in glass. When the dielectric substrate 51 is made of a resin substrate, the thickness may be in a range from 3 μm to and 300 μm. As material of a resin base, polyimide or the like is used.

By forming a metal film on the dielectric substrate 51 and patterning the same, the slot electrode 55 including the slots 57 is obtained. As the metal film, a Cu film (or Al film) having a thickness that is in a range from 1.5 μm to 5 μm may be used. Here, a stacked film is used in which a Ti film, a Cu film, and a Ti film are stacked in this order.

Then, the third insulating layer 58 (with a thickness in a range from 100 nm to 200 nm) is formed on the slot electrode 55 and in the slots 57. The third insulating layer 52 here is made of a silicon oxide ($SiO_2$) film.

Thereafter, in the non-transmission/reception region R2, the opening (contact hole) reaching a part of the slot electrode 55 is formed in the third insulating layer 58.

Then, by forming a transparent conductive film on the third insulating layer 58 and in the opening of the third insulating layer 58 and patterning the same, the upper connection part in contact with a part of the slot electrode 55 in the opening is formed, whereby the terminal part IT to be connected to the transfer terminal part PT of the TFT substrate 101 is obtained.

Thereafter, the alignment film OM2 is formed to cover the third insulating layer 58. Details of the alignment film OM2 is described later. As described above, the slot substrate 201 can be produced.

Configuration of Waveguide 301

The waveguide 301 is configured such that the reflective conductive plate 65 faces the slot electrode 55 with the dielectric substrate 51 interposed therebetween. The reflective conductive plate 65 is arranged to face a back surface of the dielectric substrate 51 with the air layer 54 interposed therebetween. Because the reflective conductive plate 65 constitutes the wall of the waveguide 301, a thickness thereof may be three or more times, preferably five or more times a skin depth. As the reflective conductive plate 65, for example, an aluminum plate, a copper plate, or the like produced by shaving and having a thickness of several mm can be used.

For example, when the scanning antenna 1000 performs transmission, the waveguide 301 guides the microwaves supplied from the power feed pin 72 arranged at the center of the antenna units U aligned concentrically, to spread the microwaves radially outward. By cutting off the microwaves at each slot 57 of each antenna unit U when the microwaves move in the waveguide 301, an electric field is generated by the so-called principle of slot antenna, and the electric field causes charges to be induced in the slot electrode 55 (i.e., the microwaves are converted to vibration of free electrons in the slot electrode 55). By changing the capacitance value of the liquid crystal capacitance through controlling the orientation of the liquid crystal in each antenna unit U, a phase of vibration of free electrons induced in the patch electrode 15 is controlled. When the charges are induced in the patch electrode 15, the electric field is generated (that is, the vibration of free electrons in the slot electrode 55 moves to the vibration of free electrons in the patch electrode 15), and the microwaves (radio waves) are oscillated from the patch electrode 15 of each antenna unit U toward outside of the TFT substrate 101. The microwaves (radio waves) of different phases oscillated from each antenna unit U is added up to allow an azimuthal angle of the beam to be controlled.

In other embodiments, the waveguide may have a two-layer structure divided into upper and lower layers. In this case, the microwaves supplied from the power feed pin first move radially outward from the center in the lower layer to the outer side, and then rises to the upper layer at the outer wall portion of the lower layer and gathers toward the center in the upper layer from the outer side. With the two layer structure described above, the microwaves can be easily distributed uniformly to each antenna unit U.

Liquid Crystal Layer LC (liquid Crystal Compound)

As the liquid crystal material (liquid crystal compound) constituting the liquid crystal layer, an isothiocyanate group-containing liquid crystal compound having large dielectric constant anisotropy (Le) is used. As the isothiocyanate group containing liquid crystal compound, for example, one shown by the following chemical formula (1) is utilized.

[CH 2]

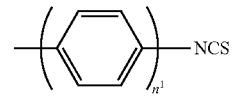

(1)

In the above chemical formula (1), $n^1$ is an integer of 1 to 5, and H in a phenylene group may be substituted by F or Cl.

In addition, as the liquid crystal material, liquid crystal compounds other than the isothiocyanate group-containing liquid crystal compound may be included as long as the object of the present invention is not impaired.

The absolute value of the dielectric constant anisotropy (Δε) of the liquid crystal material constituting the liquid crystal layer may be set in a range from 15 to 25. When the dielectric constant anisotropy (Δε) of the liquid crystal material is in the above range, the liquid crystal material (liquid crystal compound) can be made low in polarity or be made hydrophobic, and accordingly, antenna characteristics are not impaired (directivity is secured), and meanwhile, the affinity between the liquid crystal layer LC and the alignment film OM can be enhanced.

The lower limit temperature T1 of the nematic phase of the liquid crystal material constituting the liquid crystal layer LC is −32° C. or less (preferably −35° C. or less), and the upper limit temperature T1 of the nematic phase of the liquid crystal material constituting the liquid crystal layer LC is 110° C. or higher. When the lower limit temperature T1 and the upper limit temperature T2 of the liquid crystal material are in the above range, the latent air bubbles in the liquid crystal layer LC are prevented from becoming air bubbles of visible size.

The temperature width (temperature range) of the nematic phase of the liquid crystal material constituting the liquid crystal layer LC is preferably 150° C. or higher, and more preferably 160° C. or higher. When the temperature width (temperature range) of the liquid crystal material is in the above range, the latent air bubbles in the liquid crystal layer LC is easily prevented from becoming the air bubbles of visible size.

Alignment Film OM (OM1, OM2)

The alignment films OM1 and OM2 (hereinafter, may be collectively referred to as "alignment film OM") used for the TFT substrate 101 and the slot substrate 201 of the present embodiment are formed of one obtained by, for example, imidizing polyamic acid shown by the following chemical formula (2) to one shown by the following chemical formula (3) and subjecting the same to an alignment treatment such as a rubbing treatment. The alignment film OM exhibits a function of aligning the liquid crystal compound in a predetermined direction by being subjected to the alignment treatment.

[CH 3]

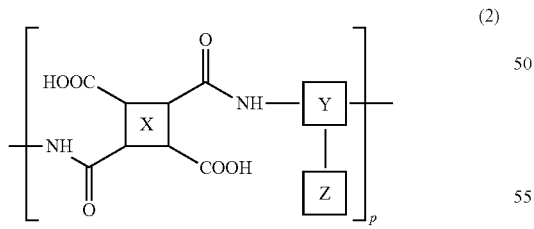

(2)

[CH 4]

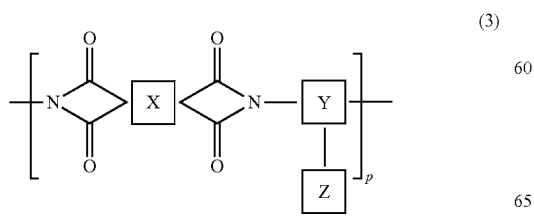

(3)

In the above chemical formula (2) and the chemical formula (3), p is an arbitral natural number. Further, in the chemical formula (2) and the chemical formula (3), X has structures represented by the following chemical formulae (4-1) to (4-16).

[CH 5]

(4-1)

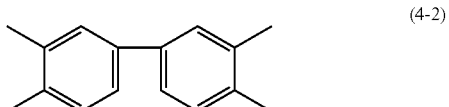
(4-2)

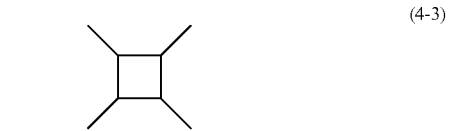
(4-3)

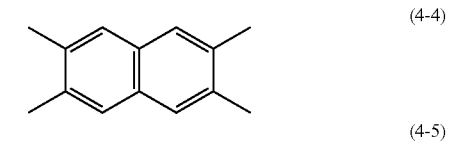
(4-4)

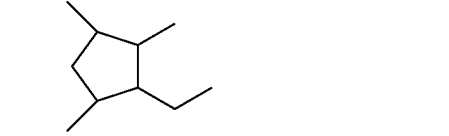
(4-5)

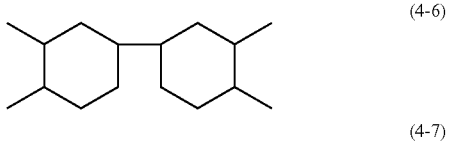
(4-6)

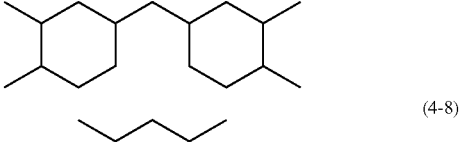
(4-7)

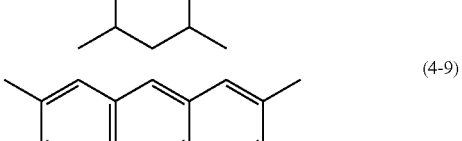
(4-8)

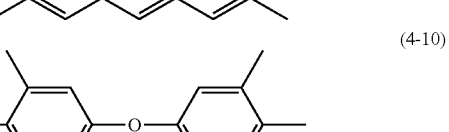
(4-9)

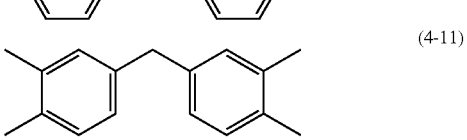
(4-10)

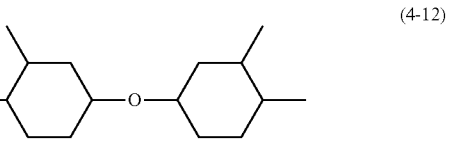
(4-11)

(4-12)

(4-13)
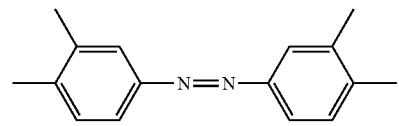
(4-14)
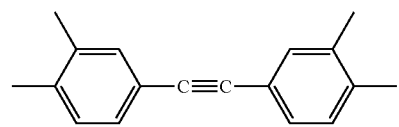
(4-15)
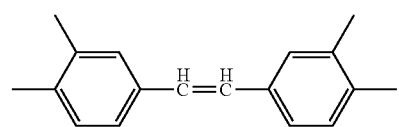
(4-16)
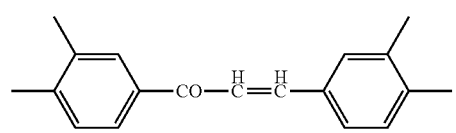
Further, in the chemical formula (2) and the chemical formula (3), Y has structures represented by the following chemical formulae (5-1) to (5-24).
[CH 6]
(5-1)
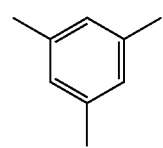
(5-2)
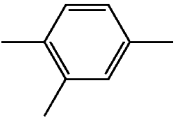
(5-3)
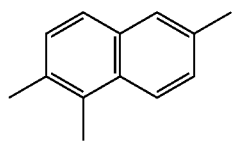
(5-4)
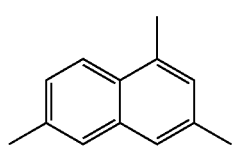
(5-5)
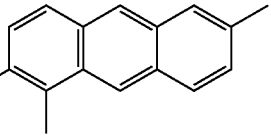
(5-6)
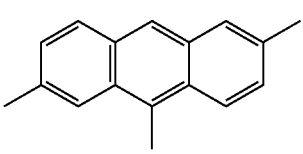
(5-7)
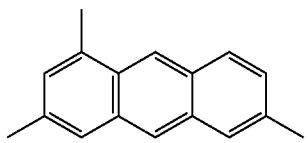
(5-8)
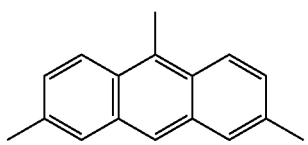
(5-9)
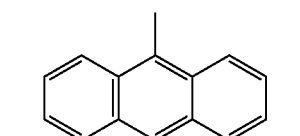
(5-10)
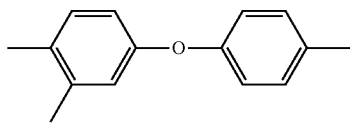
(5-11)
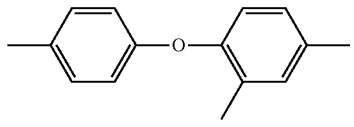
(5-12)
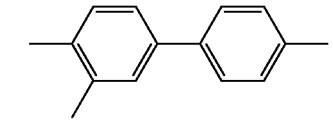
(5-13)
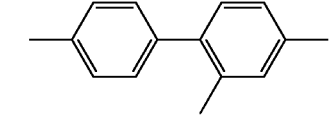
(5-14)
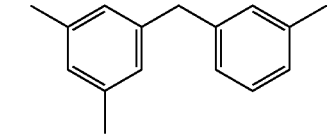
(5-15)
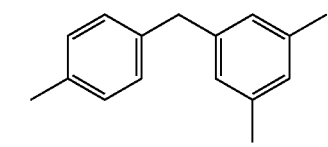
(5-16)
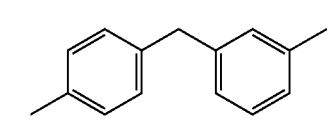
(5-17)
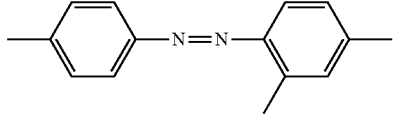

-continued

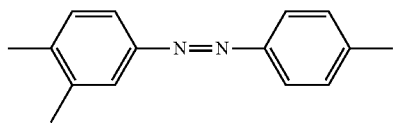
(5-18)

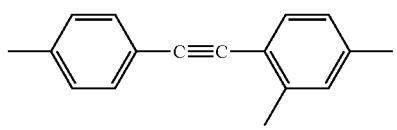
(5-19)

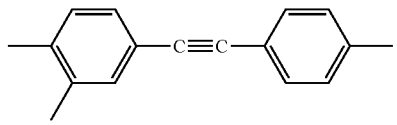
(5-20)

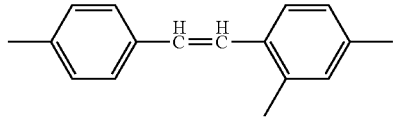
(5-21)

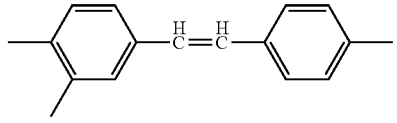
(5-22)

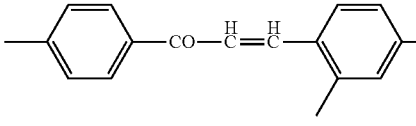
(5-23)

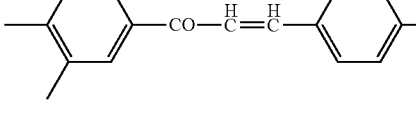
(5-24)

Moreover, in the chemical formula (2) and the chemical formula (3), Z represents a side chain. A structure of Z is not particularly limited as long as the object of the present invention is not impaired. Note that Z may not be present. In the chemical formula (2) and the chemical formula (3), when Z is not present, linking groups in the above chemical formulae (5-1) to (5-24) may be at any two places.

The imidization of the polyamic acid represented by the above chemical formula (2) is performed, for example, by heat-treating the polyamic acid at a high temperature (for example, 200 to 250° C.). Also, for example, chemical imidization may be used in which acetic anhydride or the like is used as a dehydrating agent and pyridine or the like is used as a catalyst.

The imidization ratio of the polyimide-based resin (for example, the polyimide of the above chemical formula (3) and the like) constituting the alignment film OM may be in a range from 40% to 95%, more preferably, from 40% to 60%. When the imidization ratio of the alignment film OM made of the polyimide-based resin is in the above range, the latent air bubbles in the liquid crystal material LC are effectively incorporated by the alignment film OM, and accordingly, generation of the air bubbles of visible size can be suppressed.

The alignment film OM may be a horizontal alignment film in which the alignment direction is horizontal to the substrate surface, or may be a vertical alignment film in which the alignment direction is perpendicular to the substrate surface.

The polymerization method of the polyamic acid is not particularly limited, and known methods can be used. The polyamic acid is appropriately dissolved in an organic solvent to be prepared as a fluid or sol composition (alignment agent) having fluidity.

In forming the alignment film OM, first, the alignment agent with flowability in an uncured state containing the polyamic acid represented by the above chemical formula (2) is applied on the surface of each substrate 101, 201 using a coating machine. The applied product is first pre-baked (for example, heat-treated at 80° C. for 2 minutes), and subsequently, subjected to final baking (for example, heat-treated at 210° C. for 10 minutes). Thereafter, the applied product after the final baking is subjected to the rubbing treatment, whereby the alignment film OM having alignment properties for aligning the liquid crystal compound in the predetermined direction can be obtained. In addition, the polyamic acid is mainly imidized at the time of this final baking.

As described later, a thickness of the alignment film OM1 is set such that a portion that comes into contact with a second region S2 of the liquid crystal layer LC, arranged between the groove part V located between adjacent ones of the patch electrodes 15 and the slot electrode 55 and having large thickness, becomes larger (thicker) than a portion that comes into contact with a first region S1 of the liquid crystal layer LC, arranged between each of the patch electrodes 15 and the slot electrode 55 and having small thickness. On the other hand, a thickness of the alignment film OM2 on the slot electrode 55 is set to be uniform.

Antenna Unit U

Figure 7:
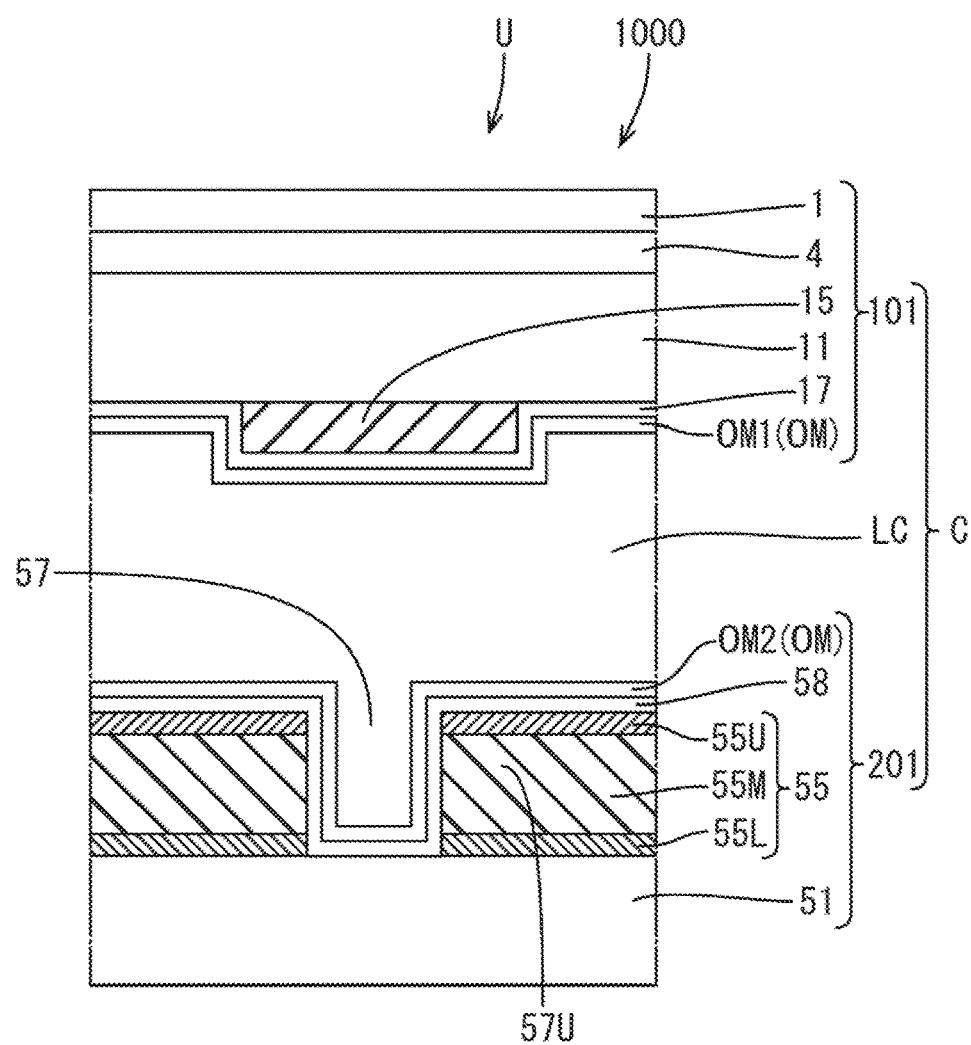
FIG. 7 is a cross-sectional view schematically showing the TFT substrate, a liquid crystal layer, and the slot substrate which constitute an antenna unit of the scanning antenna.

FIG. 7 is a cross-sectional view schematically showing the TFT substrate 101, the liquid crystal layer LC, and the slot substrate 201 which constitute the antenna unit U of the scanning antenna 1000. As shown in FIG. 7, in the antenna unit U, the island-shaped patch electrode 15 of the TFT substrate 101 and the hole-shaped (groove-shaped) slot 57 (slot electrode unit 57U) provided in the slot electrode 55 of the slot substrate 201 face each other in a manner of sandwiching the liquid crystal layer LC therebetween. The scanning antenna 1000 described above has a liquid crystal cell C including the liquid crystal layer LC, and a pair of TFT substrate 101 and slot substrate 201 including the alignment films OM1, OM2 on the surfaces on the side of the liquid crystal layer LC with the liquid crystal layer LC interposed therebetween. In the present description, the antenna unit U is constituted by including one patch electrode 15 and the slot electrode 55 (slot electrode unit 57U) in which at least one slot 57 corresponding to the patch electrode 15 is arranged.

Sealing Material

Figure 8:
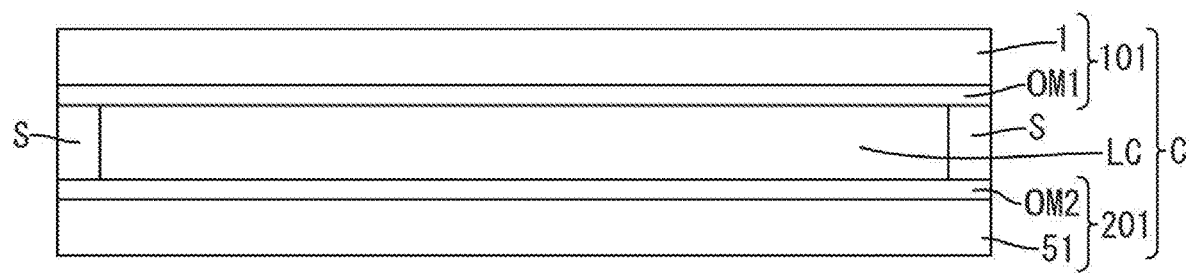
FIG. 8 is a cross-sectional view schematically showing a configuration of a liquid crystal cell.

FIG. 8 is a cross-sectional view schematically showing a configuration of the liquid crystal cell C. A sealing material S is arranged between the TFT substrate 101 (an example of the first substrate) and the slot substrate 201 (an example of the second substrate) which are the pair of substrates constituting the liquid crystal cell C, in a manner of surrounding the liquid crystal layer LC. The sealing material S adheres to the TFT substrate 101 and the slot substrate 201, and has a function of causing the TFT substrate 101 and the slot substrate 201 to adhere to each other. The TFT substrate 101 and the slot substrate 201 form the pair of substrates facing each other with the liquid crystal layer LC interposed therebetween.

The sealing material S is made of a cured product of a sealing material composition containing a curable resin. The sealing material composition of a non-solvent type is basically used. As the curable resin, a resin having a photo-curing property that cures with light (such as ultraviolet light and visible light) and/or a thermosetting property that cures with heat is used. The type of the sealing material S is appropriately selected depending on the method of injecting the liquid crystal material. For example, when the liquid crystal material is injected into the liquid crystal cell C by a one drop fill method (ODF method), as the curable resin, a curable resin having the photo-curing property (such as visible light curing property) and the thermosetting property is used for the reason of easily controlling the curing in two separate stages that are pre-curing and final curing. As the curable resin described above, for example, one that is made of a mixture of epoxy resin and acrylic resin (brand name "UVAC1561" (made by Daicel-UCB Company, Ltd.) or the like is mentioned. When the liquid crystal material is injected into the liquid crystal cell C by the vacuum injection method, a photocurable resin or thermosetting resin is used as the curable resin.

Figure 9:
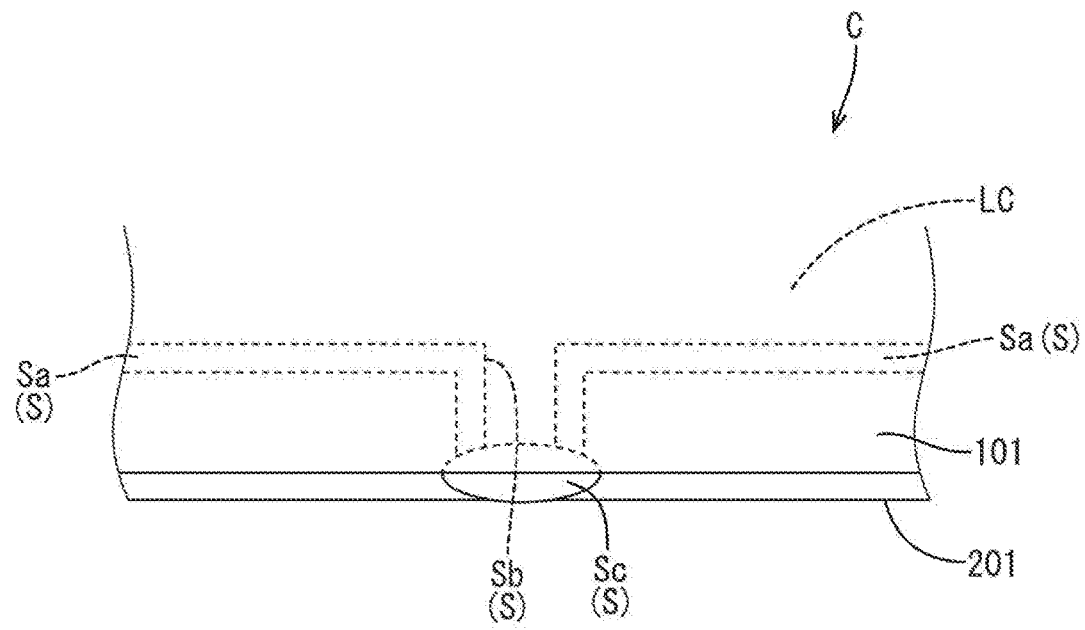
FIG. 9 is an enlarged view schematically showing a vicinity of an injection port part and a sealing part of the liquid crystal cell in which liquid crystal material is injected by a vacuum injection method.

When a liquid crystal material is injected into the liquid crystal cell C by a vacuum injection method, the sealing material S includes, as shown in FIG. 9, an injection port part Sb is provided in advance with a hole part used in injecting the liquid crystal material. The injection port part Sb is a part of the sealing material S, and is formed in communication with the outside and the side of the liquid crystal layer LC. The sealing material S used in the vacuum injection method includes a seal body part Sa including the injection port part Sb while surrounding the liquid crystal layer LC. After the liquid crystal material is injected into a space inside the seal body part Sa using the injection port part Sb, the hole part of the injection port part Sb is sealed by the sealing material. A portion which is formed of the sealing material that seals the injection port part Sb is referred to as a sealing part Sc. In the present description, the sealing part Sc constitutes a part of the sealing material S surrounding the liquid crystal layer LC.

Detailed Structure of Liquid Crystal Cell C

Figure 10:
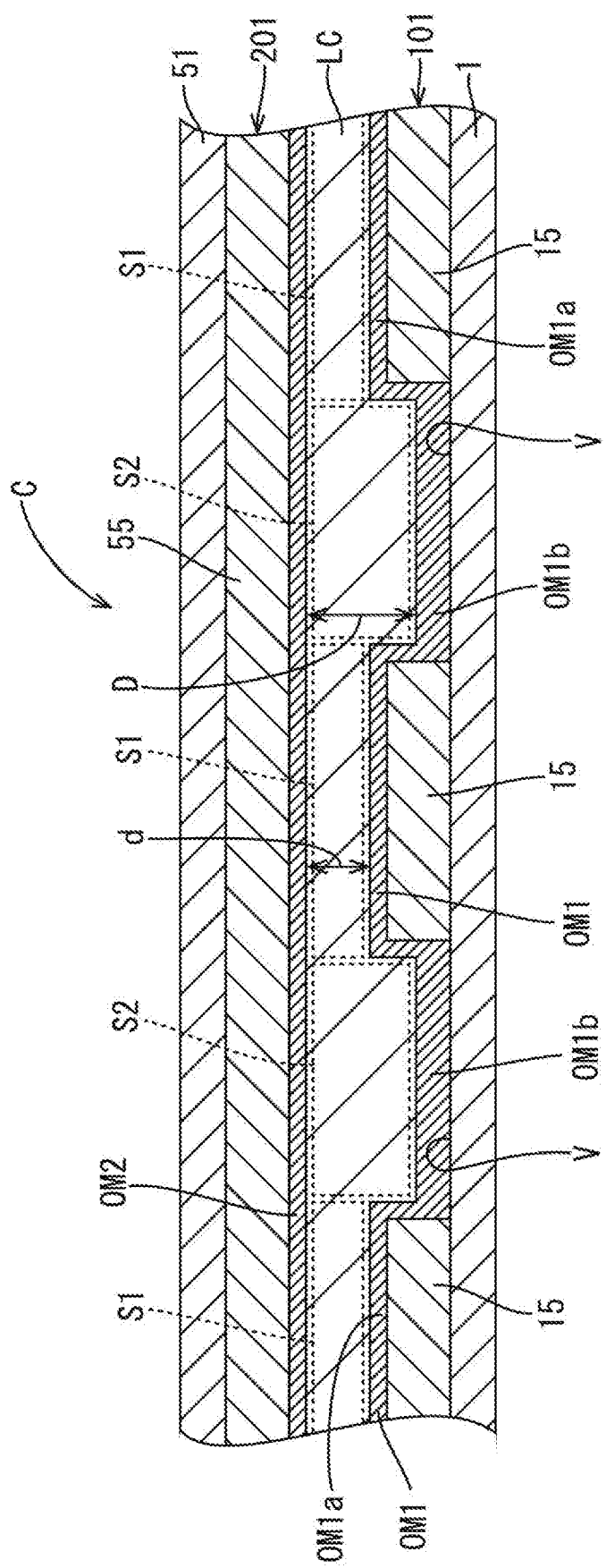
FIG. 10 is an enlarged cross-sectional view schematically showing a configuration of the liquid crystal cell.

Now, a thickness of the liquid crystal layer LC in the liquid crystal cell C, and thicknesses of the alignment films OM1, OM2, and the like are described with reference to FIG. 10. FIG. 10 is an enlarged sectional view schematically showing the configuration of the liquid crystal cell C. In FIG. 10, for convenience of explanation, as the TFT substrate 100, the patch electrodes 15 formed on the dielectric substrate 1 and the alignment film OM1 formed on the dielectric substrate 1 so as to cover the patch electrodes 15 are shown. Further, as the slot substrate 201, the slot electrode 55 formed on the dielectric substrate 51 and an alignment film OM2 formed so as to cover the slot electrode 55 are shown. In FIG. 10, for convenience of explanation, the slots of the slot electrode 55, the insulating layer between the patch electrodes 15 and the alignment film OM1, the insulating layer between the slot electrode 55 and the alignment film OM2, and the like are omitted. In addition, also in each figure shown below, the configuration is shown by being appropriately simplified.

In the liquid crystal cell C, a portion of the inner surface of the TFT substrate 101 that protrudes the most toward the liquid crystal layer LC is a portion where the patch electrode 15 is formed. Further, on the other hand, a portion of the inner surface of the TFT substrate 101 that is recessed the most is the groove part V formed between adjacent ones of the patch electrodes 15.

The liquid crystal layer LC in the liquid crystal cell C includes the first region S1 located between the patch electrode 15 and the slot electrode 55 (strictly, between the alignment film OM1 (OM1a) on the patch electrode 15 and the alignment film OM2 on the slot electrode 55) and having small thickness, and the second region S2 located between the groove part V and the slot electrode 55 (strictly, between the alignment film OM1 (OM1b) in the groove part V and the alignment film OM2 on the slot electrode 55) and having large thickness.

The liquid crystal layer LC in the first region S1 having small thickness has a relatively high proportion of liquid crystal material in contact with the alignment film OM, and is easily affected by the alignment film OM. On the other hand, in the liquid crystal layer LC in the second region S2 having large thickness, the proportion of the liquid crystal material in contact with the alignment film OM is relatively low, and the liquid crystal layer LC is not easily affected by the alignment film OM. The liquid crystal layer LC in the first region S1 that is easily affected by the alignment film OM is in contact with the alignment film OM1 (OM1a) formed on the patch electrode 15. In addition, the liquid crystal layer LC in the second region S2 that is not easily affected by the alignment film OM is in contact with the alignment film OM1 (OM1b) in the groove part V.

In the liquid crystal cell C, a difference (D−d) between a thickness d of the liquid crystal layer LC in the first region S1 and a thickness D of the liquid crystal layer LC in the second region S2 may be set in a range from 0.2 µm to 10.0 µm, more preferably, from 1.2 µm to 10.0 µm, even more preferably, from 1.5 µm to 10.0 µm. If the difference (D−d) is in the above range, the generation of visible air bubbles can be easily suppressed without impairing the antenna characteristics.

In the liquid crystal cell C, the thickness d of the liquid crystal layer LC in the first region S1 may be set in a range from 2.5 µm to 5.5 µm.

Further, the thickness of the alignment film OM1 (OM1b) in the groove part V in contact with the liquid crystal layer LC in the second region S2 is set larger as compared to the thickness of the alignment film OM1 (OM1a) on the patch electrode 15 in contact with the liquid crystal layer LC in the first region S1. Specifically, the alignment film OM1b in the groove part V may be set in a range from 2 times 10 times greater than the alignment film OM1a on the patch electrode 15, more preferably, from 4 times o to 10 times. If the thickness of the alignment film OM1b in the groove part V is larger than the thickness of the alignment film OM1a on the patch electrode 15 under the above conditions, the alignment film OM1 (particularly, the alignment film OM1b) more easily takes in the latent air bubbles in the liquid crystal layer LC efficiently, and as a result, the generation of the visible air bubbles can be more easily suppressed.

Method of Producing Scanning Antenna

The method of producing the scanning antenna (the method of producing the liquid crystal cell C) includes the step of causing the TFT substrate 101 and the slot substrate 201 to adhere to each other with the sealing material S interposed therebetween, and meanwhile, injecting the liquid crystal layer LC between the TFT substrate 101 and the slot substrate 201. As the method of injecting the liquid crystal material, the ODF method or vacuum injection method can be mentioned. Here, the method of producing the liquid crystal cell C using the vacuum injection method is described.

First, the sealing material composition for vacuum injection method is applied onto one of the TFT substrate 101 and the slot substrate 201 prepared in advance (here, the TFT substrate 101) using a seal plate or the like. At this time, the sealing material composition is applied on the substrate in a predetermined pattern to form the seal body part Sa and the injection port part Sb. A portion for forming the injection port part Sb is shaped such that the frame-like sealing material composition is partially cut out. The sealing material composition contains, for example, a thermosetting epoxy resin and the like.

Next, the sealing material composition on the substrate is heated and pre-cured. Then, the substrate (TFT substrate 101) and the other substrate (slot substrate 201) are caused to adhere to each other so as to sandwich the pre-cured sealing material composition. Thereafter, the sealing material composition is heated and finally cured. At this time, the sealing material composition is finally cured to form the seal body part Sa and the injection port part Sb.

Subsequently, by an injection-in-vacuum method, the liquid crystal material (containing a thioisocyanate group-containing liquid crystal compound) is injected into the liquid crystal cell C from the injection port part Sb under reduced pressure. After that, under normal pressure, the thermosetting or photocurable sealing material composition is applied so as to block the injection port part Sb. Then, the sealing material composition is cured by heat or light (such as ultraviolet light), and the sealing material composition becomes the sealing part Sc. Thus, the sealing material S constituted of the seal body part Sa, the injection port part Sb, and the sealing part Sc is formed. As described above, the liquid crystal cell C can be produced using the injection-in-vacuum method.

After the liquid crystal cell C is produced using the vacuum injection method as described above, on an opposite surface of the slot substrate 201 (the second dielectric substrate 51), the reflective conductive plate 65 is appropriately assembled on a side of the cell so as to face the opposite surface with the dielectric (air layer) 54 interposed therebetween. The scanning antenna of the present embodiment is produced through the above steps.

Although the liquid crystal cell used for the scanning antenna is illustrated in the above-described embodiment, the liquid crystal cell may be the one for other devices (for example, a liquid crystal cell for a liquid crystal lens which uses liquid crystal as an optical element and controls a focal length using an applied voltage) as long as the object of the present invention is not impaired.

Examples

Hereinafter, the present invention is described in more detail based on Examples. The present invention is not limited at all by these Examples.

Example 1

Production of Liquid Crystal Cell for Scanning Antenna

Figure 11:
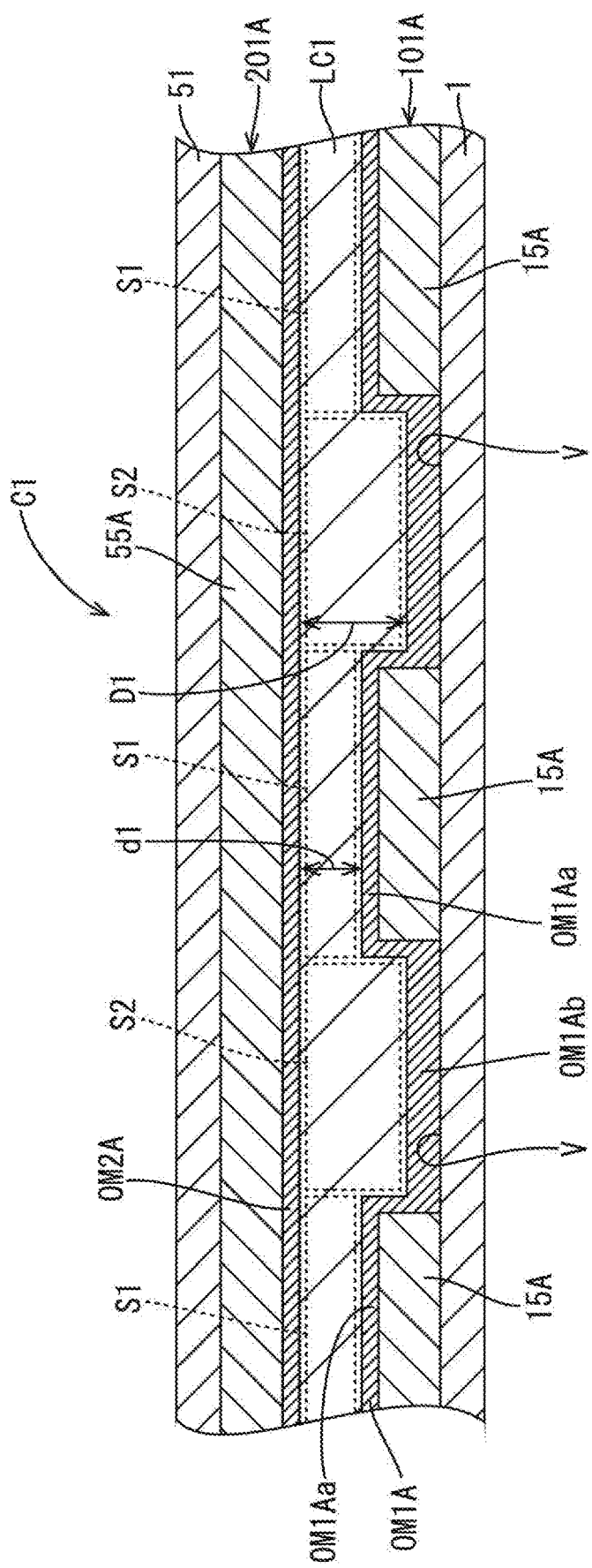
FIG. 11 is a cross-sectional view schematically showing a configuration of a liquid crystal cell of Example 1.

A liquid crystal cell C1 having a configuration shown in FIG. 11 was produced by the method shown below. First, a TFT substrate 101A having the same basic configuration as the above-described TFT substrate 101 and a slot substrate 201A having the same basic configuration as the slot substrate 201 were respectively prepared. Patch electrodes 15A of the TFT substrate 101A and a slot electrode 55A of the slot substrate 201A are made of Cu, respectively, and thicknesses thereof are both set to 3.0 μm. Further, a horizontal alignment film OM1A made of a polyimide-based resin was formed so as to cover the patch electrodes 15A, and a horizontal alignment film OM2A also made of the polyimide-based resin was formed so as to cover the slot electrode 55A. The thickness of the horizontal alignment film OM1A is set such that a portion OM1Aa covering a surface of the patch electrodes 15A is 50 nm and a portion OM1Ab covering a groove part V between the patch electrodes 15A is 200 nm. The thickness of the horizontal alignment film OM2A (thickness of the surface portion other than slots) is set to 50 nm. The imidization ratio of each of the horizontal alignment films OM1A, OM2A is 85% or greater. Each of the horizontal alignment films OM1A, OM2A was subjected to the alignment treatment by the rubbing treatment.

The TFT substrate 101A and the slot substrate 201A after the alignment treatment were caused to adhere together using sealing material with a predetermined photo spacer interposed therebetween, such that a spacing d1 (that is, the thickness of a liquid crystal layer LC1 in the first region S1) between the horizontal alignment film OM1Aa on the patch electrodes 15A and the horizontal alignment film OM2A on the opposing slot electrode 55A (excluding the slots) became 3.0 μm. Additionally, a thickness D1 of the liquid crystal layer LC1 in the second region S2 is 4.5 m. Subsequently, liquid crystal material described later containing the isothiocyanate group-containing liquid crystal compound represented by the above chemical formula (1) was injected between the two substrates 101A and 201A by the vacuum injection method, and then an injection port was sealed and the like, whereby the liquid crystal cell C1 of Example 1 was obtained.

The liquid crystal material constituting the liquid crystal layer LC1 of Example 1 has a value (absolute value) of dielectric constant anisotropy (Δε) of 21, the lower limit temperature T1 of the nematic phase of −40° C., the upper limit temperature T2 of the nematic phase of 120° C., and the temperature width (temperature range) of the nematic phase of 160° C.

The lower limit temperature T1 and the upper limit temperature T2 of the liquid crystal material were determined by observing an alignment state of the liquid crystal material while changing the temperature using the liquid crystal cell of an electrically controlled birefringence (ECB) mode in which the distance (spacing) between the substrates is 100 μm. The lower limit temperature T1 of the nematic phase and the upper limit temperature T2 of the nematic phase were determined in the same manner for liquid crystal material in the following Examples and the like.

The thickness of the horizontal alignment film OM1A of the TFT substrate 101A was determined by the following method. First, the TFT substrate 101A was divided, and cross sections of the substrate were imaged at five locations with a scanning electron microscope (SEM) to obtain five SEM images. Then, an average value of five thickness values of horizontal alignment film OM1A obtained from the above SEM images was calculated, and the average value was set to be the thickness of the horizontal alignment film OM1A. The thickness of the horizontal alignment film OM2A of the slot substrate 201A and the thickness of the alignment films in the following Examples and the like were also determined by the same method (five-point average value).

Examples 2 to 4 and Comparative Example 1

Liquid crystal cells of Examples 2 to 4 and Comparative Example 1 were produced in the same manner as in Example 1 except that liquid crystal materials having values shown in Table 1 were used for the dielectric constant anisotropy (Δε), the lower limit temperature T1, the upper limit temperature T2, and the temperature width (temperature range) of the nematic phase.

High-Low Temperature Cycle Test

The high-low temperature cycle test was performed for 2000 cycles (times) for each of the liquid crystal cells in Examples 1 to 4 and Comparative Example 1, one cycle of the test including steps of leaving the liquid crystal cell in a thermostatic chamber for 10 hours under a low temperature condition of −40° C., and then leaving the liquid crystal cell in the thermostatic chamber for 10 hours under a high temperature condition of 90° C. Here, the transition from the low temperature condition to the high temperature condition, and the transition from the high temperature condition to the low temperature condition were both performed within 30 minutes. Then, during the high-low temperature cycle test, it was visually confirmed whether or not the air bubbles were generated in each liquid crystal cell. The results are shown in Table 1. In Table 1, a case in which the air bubbles were not generated is represented by a symbol "o", a case in which the air bubbles were confirmed to be generated is represented by a symbol "x", and the number of times of tests in which the air bubbles were confirmed is also indicated. In addition, the result of whether the air bubbles were generated and the number of times of performing the test were represented by the same manner also in the subsequent tables.

the lower limit temperature T1 of the liquid crystal material used in Examples 3 and 4 is −40° C. or higher, which is higher than that of Example 2, the gas component (gas molecule) was discharged from the liquid crystal material, and further, because the upper limit temperature T2 is 120° C. or lower, which is lower than that of Example 2, expansion and aggregation of the gas component (gas molecule) occurred.

In the liquid crystal cell of Comparative Example 1, although the visible air bubbles were not generated even when the high-low temperature cycle test was performed 500 times, the visible air bubbles were generated in the 600th high-low temperature cycle test. The reason of the above is presumed that the lower limit temperature T1 of the liquid crystal material is −25° C. and the upper limit temperature T2 is 115° C., and therefore, the temperature range in which the liquid crystal material can maintain the nematic phase is as narrow as 140° C.

Figure 12:
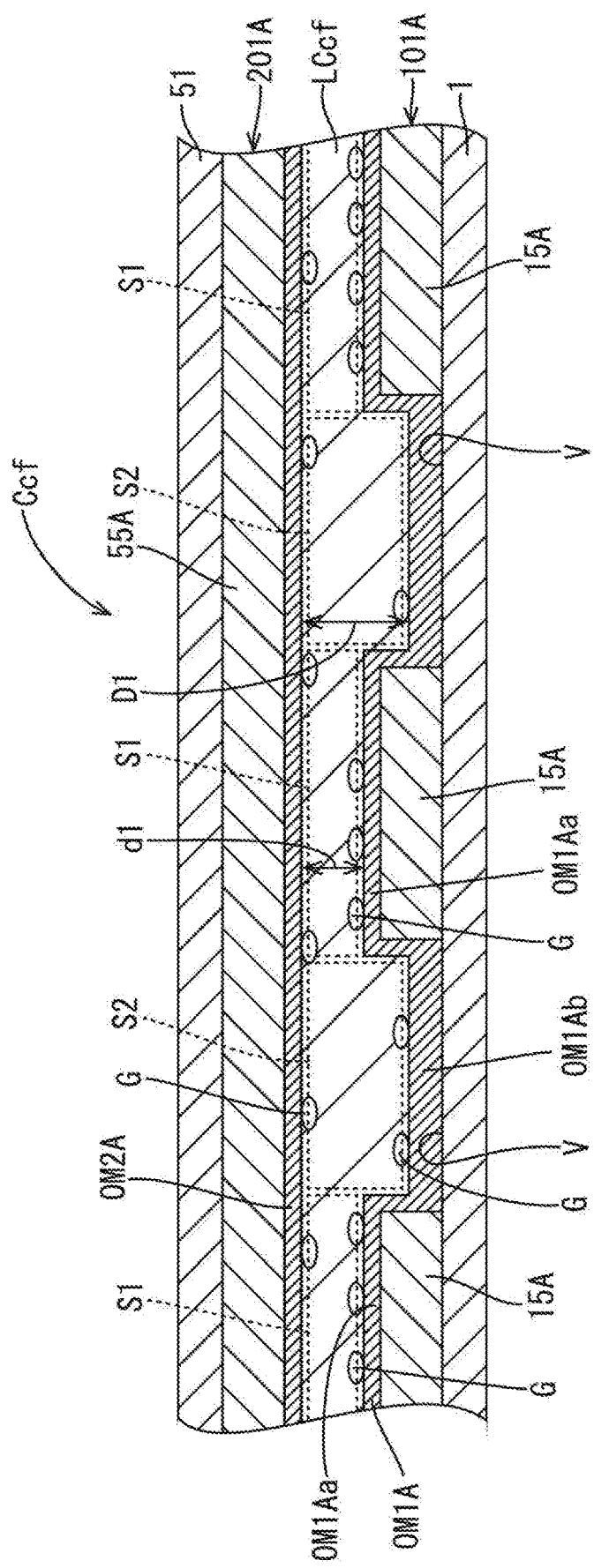
FIG. 12 is a cross-sectional view schematically showing a state in which air bubbles are generated in a low temperature environment in a liquid crystal cell of Comparative Example 1.
Figure 13:
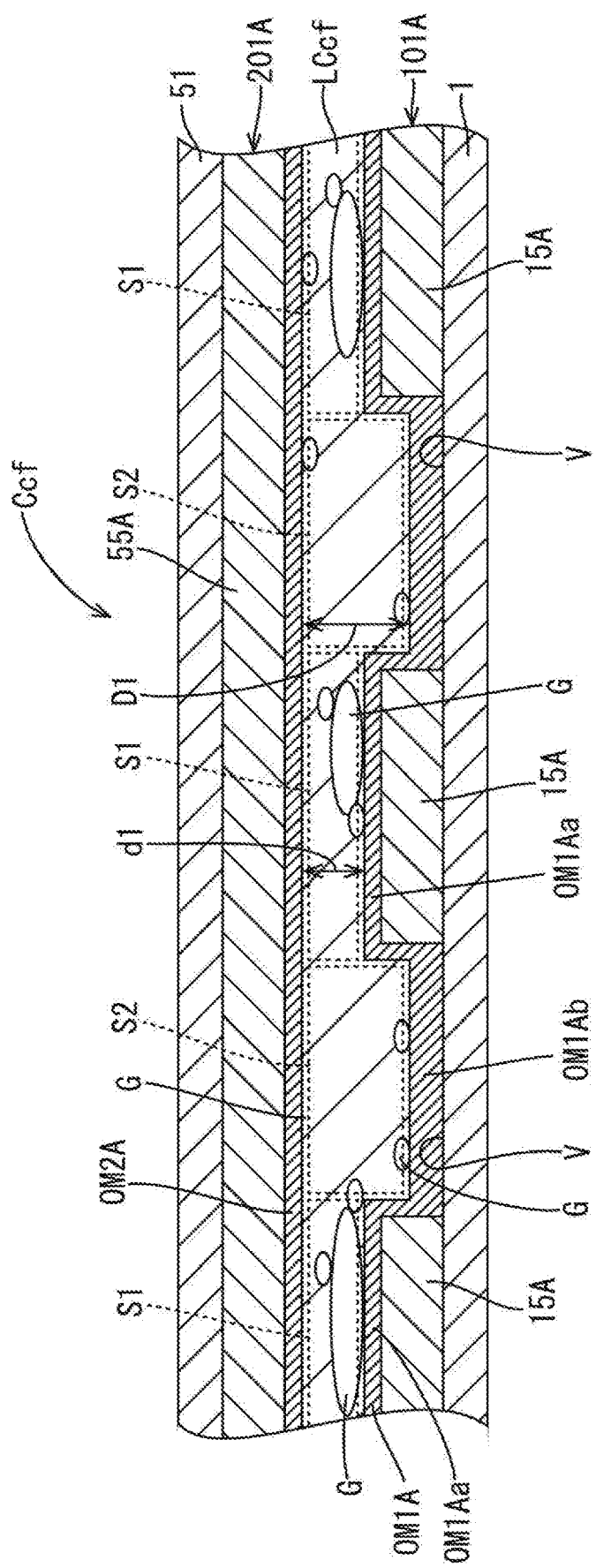
FIG. 13 is a cross-sectional view schematically showing a state in which the air bubbles are expanded and aggregated in a high temperature environment in the liquid crystal cell of Comparative Example 1.

Here, with reference to FIG. 12 and FIG. 13, the principle of the air bubbles being generated in a liquid crystal layer LCcf in a liquid crystal cell Ccf of the Comparative Example 1 is described. In the liquid crystal material constituting the liquid crystal layer LCcf, the gas components (latent air bubbles) at levels that are latently invisible are present. The latent air bubbles tend to be present at an interface between the liquid crystal layer CLcf in the first region S1 where the thickness of the liquid crystal layer CLcf is small and the horizontal alignment film OM1A (OM1Aa). On the other hand, the latent air bubbles are presumed to be present in a

TABLE 1

| | LIQUID CRYSTAL MATERIAL | | | | HIGH-LOW TEMPERATURE CYCLE TEST | | |
|---|---|---|---|---|---|---|---|
| | | NEMATIC PHASE | | | | | |
| | | LOWER LIMIT | UPPER LIMIT | | | | |
| | Δε | TEMPERATURE T1 (° C.) | TEMPERATURE T2 (° C.) | TEMPERATURE RANGE (° C.) | 500 TIMES | 1000 TIMES | 2000 TIMES |
| EXAMPLE 1 | 21 | −40 | 120 | 160 | o | o | o |
| EXAMPLE 2 | 23 | −43 | 140 | 183 | o | o | o |
| EXAMPLE 3 | 20 | −35 | 120 | 155 | o | o | x (1210) |
| EXAMPLE 4 | 20 | −40 | 110 | 150 | o | o | x (1350) |
| COMPARATIVE EXAMPLE 1 | 19 | −25 | 115 | 140 | o | x (610) | x |

As shown in Table 1, in the liquid crystal cells of Examples 1 and 2, the visible air bubbles were not generated even after 2000 times of the high-low temperature cycle test. This is because the temperature range of the nematic phase of the liquid crystal material used in Examples 1 and 2 is 160° C. or higher the lower limit temperature T1 is −40° C. or lower, and the upper limit temperature T2 is 120° C. or higher. During the high-low temperature cycle test, the nematic phase was presumed to be stable.

Further, in the liquid crystal cells of Examples 3 and 4, the visible air bubbles were not generated even when the high-low temperature cycle test was performed 1000 times. It can be said that the liquid crystal cells are the ones in which the generation of air bubbles is suppressed and which have no problem in the actual use. In the liquid crystal cell of Example 3, the air bubbles were generated in the 1210th high-low temperature cycle test, and in the liquid crystal cell of Example 4, the air bubbles were generated in the 1350th high-low temperature cycle test. It is presumed that because relatively small amount at an interface between the liquid crystal layer CLcf in the second region S2 where the thickness of the liquid crystal layer CLcf is large and the horizontal alignment film OM1A (OM1Ab).

FIG. 12 is a cross-sectional view schematically showing a state in which air bubbles G are generated in the liquid crystal cell Ccf of Comparative Example 1 under a low temperature environment. In the liquid crystal cell Ccf, in the low temperature environment of the repeatedly performed high-low temperature cycle test, the air bubbles G of invisible size are presumed to be generated at an interface between a liquid crystal layer CLcf and the horizontal alignment film OM1A (OM1Aa) in the first region S1 where the thickness of the liquid crystal layer LCcf is small. It is presumed that this is because the liquid crystal material cannot maintain the nematic phase in the low temperature environment, and solidifying thereof causes the latent air bubbles contained in the liquid crystal material to be discharged. It is presumed that the discharge of the air bubbles described above often occurs at the interface between the liquid crystal layer CLcf and the horizontal alignment film OM1A (OM1Aa) in the first region (region where the distance between the substrates is short) where many latent air bubbles are presumed to be present.

FIG. 13 is a cross-sectional view schematically showing a state in which the air bubbles G expand and aggregate in a high temperature environment in the liquid crystal cell Ccf of Comparative Example 1. In the liquid crystal cell Ccf, in the high-low temperature cycle test after the 600th time, the air bubbles G expanded and aggregated in the high temperature environment and became a visible size. It is presumed that the above expansion and aggregation of the air bubbles G are likely to occur at the interface between the liquid crystal layer CLcf and the horizontal alignment film OM1A (OM1Aa), in the first region S1 where many latent air bubbles are presumed to be present. In addition, the expansion and aggregation of the air bubble G were hardly confirmed at the interface between the liquid crystal layer CLcf and the horizontal alignment film OM1A (OM1Ab) in the second region S2.

Example 5

Production of Liquid Crystal Cell for Scanning Antenna

Figure 14:
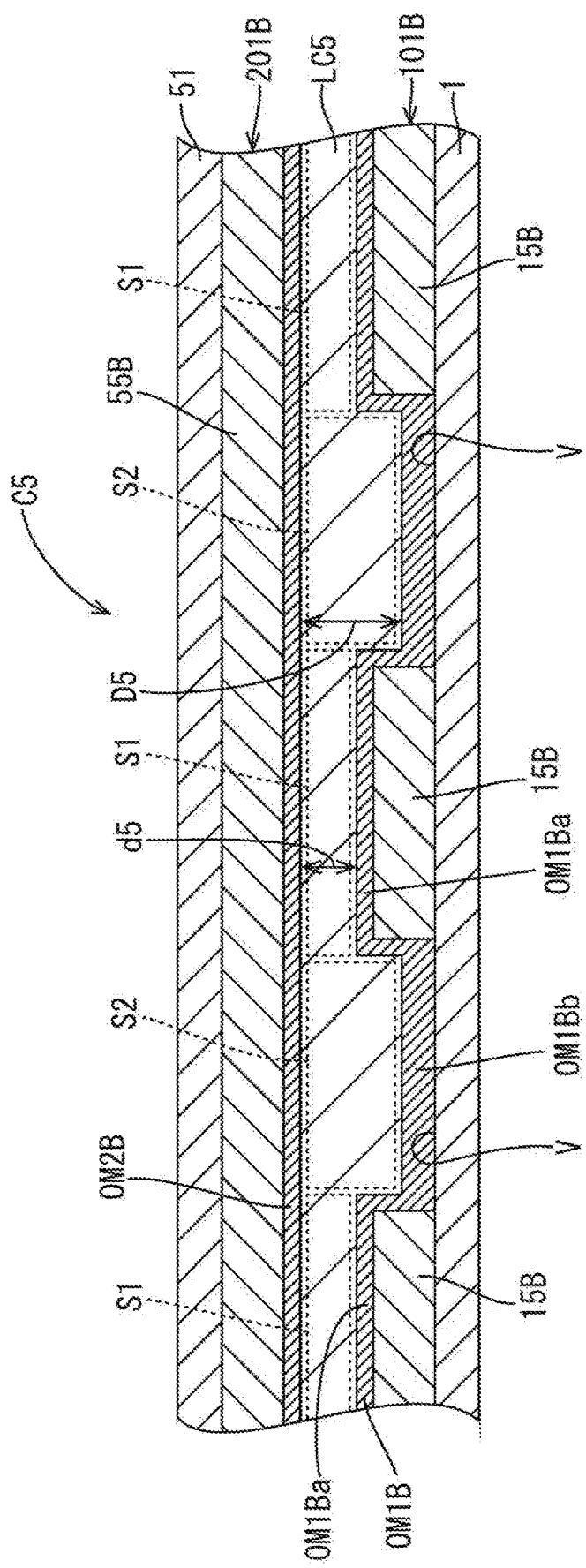
FIG. 14 is a cross-sectional view schematically showing a configuration of a liquid crystal cell of Example 5.

A liquid crystal cell C5 having a configuration shown in FIG. 14 was produced by the method shown below. First, a TFT substrate 101B having the same basic configuration as the above-described TFT substrate 101 and a slot substrate 201B having the same basic configuration as the slot substrate 201 were respectively prepared. Patch electrodes 15B of the TFT substrate 101B and a slot electrode 55B of the slot substrate 201B are made of Cu, respectively, and their thicknesses are both set to 2.5 μm. Further, a horizontal alignment film OM1B made of the same polyimide-based resin as in Example 1 was formed so as to cover the patch electrodes 15B, and a horizontal alignment film OM2B made of the same polyimide-based resin as in Example 1 was formed so as to cover the slot electrode 55B. The thickness of the horizontal alignment film OM1B is set such that a horizontal alignment film OM1Ba in a portion covering a surface of the patch electrodes 15B is 50 nm, and a horizontal alignment film OM1Bb in a portion covering a groove part V between the patch electrodes 15B is 200 nm. In addition, the thickness of the horizontal alignment film OM2B (thickness of the surface portion other than slots) is set to 50 nm. The imidization ratio of each of the horizontal alignment films OM1B, OM2B is 85% or greater as in Example 1. Further, in the same manner as in Example 1, each of the horizontal alignment films OM1B, OM2B was subjected to the alignment treatment by the rubbing treatment.

The TFT substrate 101B and the slot substrate 201B after the alignment treatment were caused to adhere together using sealing material with a predetermined photo spacer interposed therebetween, such that a distance d5 (that is, the thickness of a liquid crystal LC5 in the first region S1) between the horizontal alignment film OM1Ba on the patch electrodes 15B and the horizontal alignment film OM2B on the opposing slot electrode 55B (excluding the slots) became 2.7 μm. Additionally, a thickness D5 of the liquid crystal layer LC5 in the second region S2 is 3.7 μm. Subsequently, liquid crystal material described later containing the isothiocyanate group-containing liquid crystal compound represented by the above chemical formula (1) was injected between the two substrates 101B, 201B by the vacuum injection method, and then an injection port was sealed and the like, whereby the liquid crystal cell C5 of Example 5 was obtained.

The liquid crystal material constituting the liquid crystal layer LC5 of Example 5 has the absolute value of dielectric constant anisotropy (Δε) of 15, the lower limit temperature T1 of the nematic phase of −32° C., the upper limit temperature T2 of the nematic phase of 118° C., and the temperature width (temperature range) of the nematic phase of 150° C.

Comparative Example 2

A liquid crystal cell of Comparative Example 2 was produced in the same manner as in Example 5 except that liquid crystal material having values shown in Table 2 was used for the dielectric constant anisotropy (Δε), the lower limit temperature T1, the upper limit temperature T2, and the temperature width (temperature range) of the nematic phase.

High-Low Temperature Cycle Test

For each of the liquid crystal cells of Example 5 and Comparative Example 2, the high-low temperature cycle test similar to that of Example 1 was performed. The results are shown in Table 2. In Table 2, results of Examples 2, 3 are also shown for comparison.

TABLE 2

| | LIQUID CRYSTAL MATERIAL | | | | | | |
|---|---|---|---|---|---|---|---|
| | | NEMATIC PHASE | | | HIGH-LOW TEMPERATURE CYCLE TEST | | |
| | | LOWER LIMIT | UPPER LIMIT | | | | |
| | Δε | TEMPERATURE T1 (° C.) | TEMPERATURE T2 (° C.) | TEMPERATURE RANGE (° C.) | 500 TIMES | 1000 TIMES | 2000 TIMES |
| COMPARATIVE EXAMPLE 2 | 26 | −40 | 120 | 160 | ○ | x (950) | x |
| EXAMPLE 2 | 23 | −43 | 140 | 183 | ○ | ○ | ○ |
| EXAMPLE 3 | 20 | −35 | 120 | 155 | ○ | ○ | x (1300) |
| EXAMPLE 5 | 15 | −32 | 118 | 150 | ○ | ○ | x (1550) |

As shown in Table 2, in the liquid crystal cell of Example 5, the visible air bubbles were not generated even after 1000 times of the high-low temperature cycle test. It can be said that the liquid crystal cell is the one in which the generation of air bubbles is suppressed and which has no problem in the actual use. In the liquid crystal cell of Example 5, the visible air bubbles were generated in the 1550th high-low temperature cycle test. It is presumed that, although the temperature range of the nematic phase of the liquid crystal material used in Example 5 is 150° C., because Δε is 15, the above result is obtained.

On the other hand, in the liquid crystal cell of Comparative Example 2, although the visible air bubbles were not generated even after the high-low temperature cycle test was performed 500 times, the visible air bubbles were generated in the 950th high-low temperature cycle test. Although the temperature range of the nematic phase of the liquid crystal material used in Comparative Example 2 is 160° C., because Δε is as large as 26, the affinity between the alignment film and the liquid crystal material (liquid crystal layer) is low and many latent air bubbles were present on the surface of the alignment film, it is presumed that air bubbles were generated as described above.

From the above results, it has been confirmed that Δε of the liquid crystal material also affects the generation of air bubbles. In order to improve the affinity with the alignment film surface within a range not impairing the antenna characteristics (range that can ensure directivity), it is preferable to reduce Δε of the liquid crystal material. Specifically, Δε is preferably set to 25 or less. The liquid crystal material preferably be low in polarity or hydrophobic by reducing Δε. A lower limit value of Δε of the liquid crystal material is preferably 15 or greater in order to ensure antenna characteristics and the like.

Example 6

Production of Liquid Crystal Cell for Scanning Antenna

Figure 15:
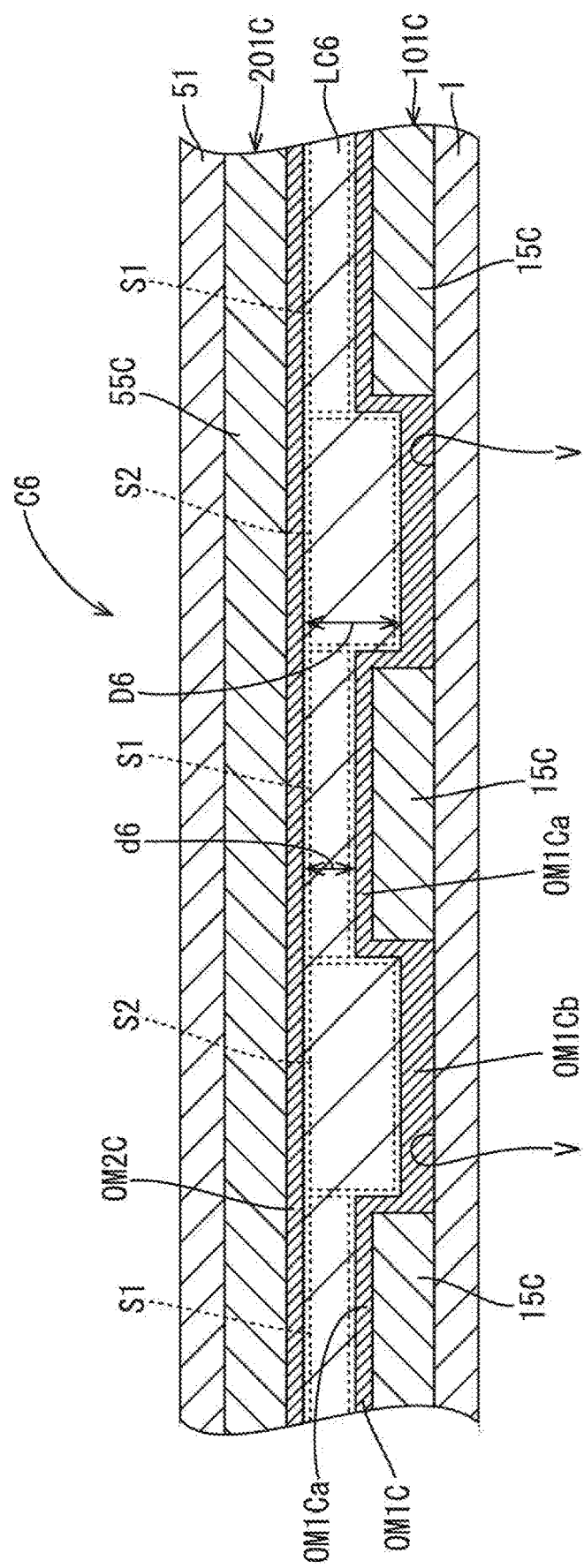
FIG. 15 is a cross-sectional view schematically showing a configuration of a liquid crystal cell of Example 6.

A liquid crystal cell C6 having a configuration shown in FIG. 15 was produced by the method shown below. First, a TFT substrate 101C having the same basic configuration as the above-described TFT substrate 101 and a slot substrate 201C having the same basic configuration as the slot substrate 201 are respectively prepared. Patch electrodes 15C of the TFT substrate 101C and a slot electrode 55C of the slot substrate 201C are made of Cu, respectively, and the thickness of the slot electrode 55C is set to 3.0 μm, and the thickness of the patch electrode 15C is set to 0.5 μm. Further, a horizontal alignment film OM1C made of the same polyimide-based resin as in Example 1 was formed so as to cover the patch electrodes 15C, and a horizontal alignment film OM2C made of the same polyimide-based resin as in Example 1 was formed so as to cover the slot electrode 55C. The thickness of the horizontal alignment film OM1C is set such that a horizontal alignment film OM1Ca in a portion covering a surface of the patch electrodes 15C is 30 nm, and a horizontal alignment film OM1Cb in a portion covering a groove part V between the patch electrodes 15C is 300 nm.

Further, the thickness of the horizontal alignment film OM2C (thickness of the surface portion other than slots) is set to 30 nm. The imidization ratio of each of the horizontal alignment films OM1C, OM2C is 85% or greater as in Example 1. Further, in the same manner as in Example 1, each of the horizontal alignment films OM1C, OM2C was subjected to the alignment treatment by the rubbing treatment.

The TFT substrate 101C and the slot substrate 201C after the alignment treatment were caused to adhere together using sealing material with a predetermined photo spacer interposed therebetween, such that a distance d6 (that is, the thickness of a liquid crystal layer LC6 in the first region S1) between the horizontal alignment film OM1Ca on the patch electrodes 15C and the horizontal alignment film OM2C on the opposing slot electrode 55C (excluding the slots) became 2.5 μm. Subsequently, liquid crystal material similar to that of Example 1 containing the isothiocyanate group-containing liquid crystal compound shown in the above chemical formula (1) was injected between the two substrates 101C, 201C by the vacuum injection method, and then an injection port was sealed and the like, whereby the liquid crystal cell C6 of Example 6 was obtained. In FIG. 15, a distance between the horizontal alignment film OM1Cb on the groove part V between the patch electrodes 15C and the horizontal alignment film OM2C on the opposing slot electrode 55C (that is, the thickness of the liquid crystal layer LC6 in the second region S2) is shown by a reference symbol D6.

Examples 7 to 10 and Comparative Example 3

Liquid crystal cells of Examples 7 to 10 and Comparative Example 3 were produced in the same manner as in Example 6 except that the thickness of the copper-made patch electrodes 15C in the TFT substrate 101C was changed to values shown in Table 3.

Examples 11 to 15 and Comparative Example 4

Liquid crystal cells of Examples 11 to 15 and Comparative Example 4 were produced in the same manner as in Example 6 except that the liquid crystal material used for each of the liquid crystal cells of Examples 6 to 10 and Comparative Example 3 was changed to that of the above Example 4.

High-Low Temperature Cycle Test

The high-low temperature cycle test similar to that of Example 1 was performed on each of the liquid crystal cells of Examples 7 to 15 and Comparative Examples 3, 4. The results are shown in Table 3. A difference in thickness of the liquid crystal layer in Table 3 is a value of D6–d6.

TABLE 3

| | THICKNESS OF PATCH ELECTRODE (μm) | DIFFERENCE IN THICKNESS OF LIQUID CRYSTAL LAYER (D6 – d6] (μm) | LIQUID CRYSTAL MATERIAL | | | | HIGH-LOW TEMPERATURE CYCLE TEST | | |
|---|---|---|---|---|---|---|---|---|---|
| | | | | NEMATIC PHASE | | | | | |
| | | | Δε | LOWER LIMIT TEMPERATURE T1 (° C.) | UPPER LIMIT TEMPERATURE T2 (° C.) | TEMPERATURE RANGE (° C.) | 500 TIMES | 1000 TIMES | 2000 TIMES |
| EXAMPLE 6 | 0.5 | 0.23 | 21 | −40 | 120 | 160 | ○ | ○ | ○ |
| EXAMPLE 7 | 1.5 | 1.23 | 21 | −40 | 120 | 160 | ○ | ○ | ○ |
| EXAMPLE 8 | 3.0 | 2.73 | 21 | −40 | 120 | 160 | ○ | ○ | ○ |

TABLE 3-continued

|  | THICKNESS OF PATCH ELECTRODE (μm) | DIFFERENCE IN THICKNESS OF LIQUID CRYSTAL LAYER (D6 − d6] (μm) | Δε | LIQUID CRYSTAL MATERIAL NEMATIC PHASE ||| HIGH-LOW TEMPERATURE CYCLE TEST |||
|---|---|---|---|---|---|---|---|---|---|
|  |  |  |  | LOWER LIMIT TEMPER- ATURE T1 (° C.) | UPPER LIMIT TEMPER- ATURE T2 (° C.) | TEMPER- ATURE RANGE (° C.) | 500 TIMES | 1000 TIMES | 2000 TIMES |
| EXAMPLE 9 | 5.0 | 4.73 | 21 | −40 | 120 | 160 | ○ | ○ | x (1740) |
| EXAMPLE 10 | 10.0 | 9.73 | 21 | −40 | 120 | 160 | ○ | ○ | x (1210) |
| COMPARATIVE EXAMPLE 3 | 15.0 | 14.73 | 21 | −40 | 120 | 160 | ○ | x (970) | x |
| EXAMPLE 11 | 0.5 | 0.23 | 20 | −40 | 110 | 150 | ○ | ○ | ○ |
| EXAMPLE 12 | 1.5 | 1.23 | 20 | −40 | 110 | 150 | ○ | ○ | x (1600) |
| EXAMPLE 13 | 3.0 | 2.73 | 20 | −40 | 110 | 150 | ○ | ○ | x (1350) |
| EXAMPLE 14 | 5.0 | 4.73 | 20 | −40 | 110 | 150 | ○ | ○ | x (1190) |
| EXAMPLE 15 | 10.0 | 9.73 | 20 | −40 | 110 | 150 | ○ | ○ | x (1020) |
| COMPARATIVE EXAMPLE 4 | 15.0 | 14.73 | 20 | −40 | 110 | 150 | ○ | x (790) | x |

As shown in Table 3, in the liquid crystal cells of Examples 6 to 15, the visible air bubbles were not generated even after 1000 times of the high-low temperature cycle test. It can be said that the liquid crystal cell is the one in which the generation of air bubbles is suppressed and which has no problem in the actual use. As shown above, the generation of air bubbles is suppressed when the difference (D6–d6) between the thickness (D6) of the liquid crystal layer in the region (second region S2) where the distance between the substrates 101C, 201C is long and the thickness (d6) of the liquid crystal layer in the region (first region S1) where the distance between the substrates 101C, 201C is short, is small and within a predetermined range.

In the liquid crystal cell of Example 9, the visible air bubbles were generated in the 1740th high-low temperature cycle test, and in the liquid crystal cell of Example 10, the visible air bubbles were generated in the 1210th high-low temperature cycle test. Further, the visible air bubbles were generated in the high-low temperature cycle test, in the 1600th time in the liquid crystal cell of Example 12, in the 1350th time in the liquid crystal cell of Example 13, in the 1190th time in the liquid crystal cell of Example 14, and in the 1020th time in the liquid crystal cell of Example 15, respectively.

On the other hand, in the liquid crystal cells of Comparative Examples 3, 4, the visible air bubbles were generated in less than 1000 times of the number of times of the test (970 times, 790 times). It is presumed that when the difference (D6–d6) in the thickness of the liquid crystal layer is large, the latent air bubbles are easily aggregated at the interface between the liquid crystal layer and the alignment film in the region (first region S1) where the thickness of the liquid crystal layer is small, and therefore, a probability of the generation of air bubbles increases. In addition, it has been confirmed that, for Examples 6 to 10 using the liquid crystal material having a wider temperature range of the nematic phase (liquid crystal material of Example 1 having the temperature range of 160° C.), the air bubbles are not easily generated in any condition of the difference in the thickness of the liquid crystal layer, as compared to Examples 11 to 15 using the liquid crystal material having a narrower temperature range (liquid crystal material of Example 4 having the temperature range of 150° C.).

The difference (D6–d6) in thickness of the liquid crystal layer is preferably set to 1.2 μm or greater, more preferably 1.5 μm or greater, for the purpose of improving antenna characteristics and the like.

Example 16

Production of Liquid Crystal Cell for Scanning Antenna

Figure 16:
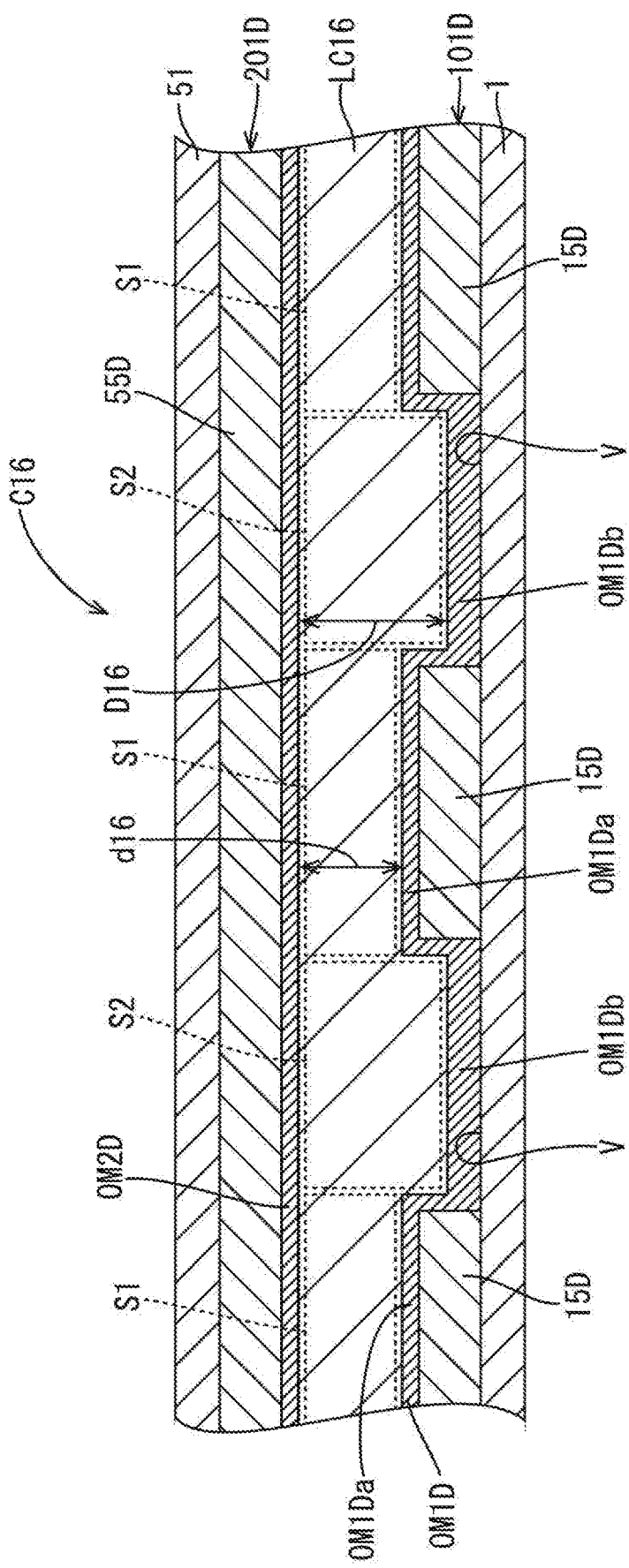
FIG. 16 is a cross-sectional view schematically showing a configuration of a liquid crystal cell of Example 16.

A liquid crystal cell C16 having a configuration shown in FIG. 16 was produced by the method shown below. First, a TFT substrate 101D having the same basic configuration as the above-described TFT substrate 101 and a slot substrate 201D having the same basic configuration as the slot substrate 201 were respectively prepared. Patch electrodes 15D of the TFT substrate 101D and a slot electrode 55D of the slot substrate 201D are made of Cu, respectively, and their thicknesses are both set to 3.0 μm. Further, in the TFT substrate 101D, a coating film was formed by applying an alignment agent containing a polyimide-based resin having an imidization ratio of 30% so as to cover the patch electrodes 15D, and the coating film was heated at 80° C. for 5 minutes to be pre-baked. The coating film after the pre-baking was subjected to final baking by heating at 160° C. for 20 minutes, and then, by performing the alignment treatment by the rubbing treatment, a horizontal alignment film OM1D made of a polyimide resin having an imidization ratio of 45% was obtained. Further, in the slot substrate 201D, a coating film was formed by applying an alignment agent containing a polyimide-based resin similarly having a polyimidization ratio of 30% so as to cover the slot electrode 55D, and in the same condition as in the TFT substrate 101D, the coating film was subjected to pre-baking, final baking, and the alignment treatment, whereby a horizontal alignment film OM2D made of a polyimide resin having an imidization ratio of 45% was obtained.

The thickness of the horizontal alignment film OM1D is set such that a horizontal alignment film OM1Da in a portion covering a surface of the patch electrodes 15D is 10 nm, and a horizontal alignment film OM1Db in a portion covering a groove part V between the patch electrodes 15D is 100 nm. The thickness of the horizontal alignment film OM2D (thickness of the surface portion other than slots) is set to 10 nm.

The TFT substrate 101D and the slot substrate 201D after the alignment treatment were caused to adhere together using sealing material with a predetermined photo spacer interposed therebetween, such that a distance d16 (spacing) between the horizontal alignment film OM1Da on the patch electrodes 15D and the horizontal alignment film OM2D on the opposing slot electrode 55D (excluding the slots) became 5.0 μm. Additionally, a thickness D16 of the liquid crystal layer LC16 in the second region S2 is 7.1 μm. Subsequently, liquid crystal material similar to that of Example 4 containing the isothiocyanate group-containing liquid crystal compound represented by the above chemical formula (1) was injected between the two substrates 101D, 201D by the vacuum injection method, and then an injection port was sealed and the like, whereby the liquid crystal cell C16 of Example 16 was obtained.

Examples 17 to 19 and Comparative Example 5

Liquid crystal cells of Examples 17 to 19 and Comparative Example 5 were produced in the same manner as in Example 16 except that the temperature condition of final baking was changed to those shown in Table 4, and the imidization ratio (%) of the horizontal alignment film OM1D of the TFT substrate 101D and the imidization ratio (%) of the horizontal alignment film OM2D of the slot substrate 201D were changed to those shown in Table 4.

High-Low Temperature Cycle Test

The high-low temperature cycle test similar to that of Example 1 was performed on each of the liquid crystal cells of Examples 17 to 19 and Comparative Example 5. The results are shown in Table 4.

having the imidization ratio of 50% or less, the visible air bubbles were not generated even after 2000 times of the high-low temperature cycle test. When the imidization ratio of the alignment film is low, the affinity between the carboxyl group in the polyamic acid before imidization and the isothiocyanate group of the liquid crystal material (liquid crystal compound) is high. Therefore, even when a difference in thickness of the liquid crystal layer is about 3.0 μm, the latent air bubbles (gas molecules) are not aggregated at the interface between the liquid crystal layer LC16 and the alignment film, and are uniformly dispersed in the liquid crystal layer LC16. As a result, in the high-low temperature cycle test, it is presumed that there was no generation of air bubbles (aggregation of gas molecules).

In the liquid crystal cell of Example 18, the visible air bubbles were generated in the 1700th high-low temperature cycle test, and in the liquid crystal cell of Example 19, the visible air bubbles were generated in the 1190th high-low temperature cycle test.

On the other hand, as shown in Table 4, as the imidization ratio of the alignment film increases, the probability of the generation of visible air bubbles increases. In particular, in the liquid crystal cell of Comparative Example 5 having the imidization ratio of 96%, the visible air bubbles were generated in the 980th high-low temperature cycle test. This is because when the imidization ratio becomes high, the hydrophobicity of the surface of the alignment film increases to cause the affinity between the alignment film and the isothiocyanate group of the liquid crystal material (liquid crystal compound) to decrease. Therefore, the latent air bubbles in the liquid crystal material is presumed to be aggregated at the interface between the liquid crystal layer LC16 and the alignment film OM1D and the like.

Example 20

Production of Liquid Crystal Cell for Scanning Antenna

Figure 17:
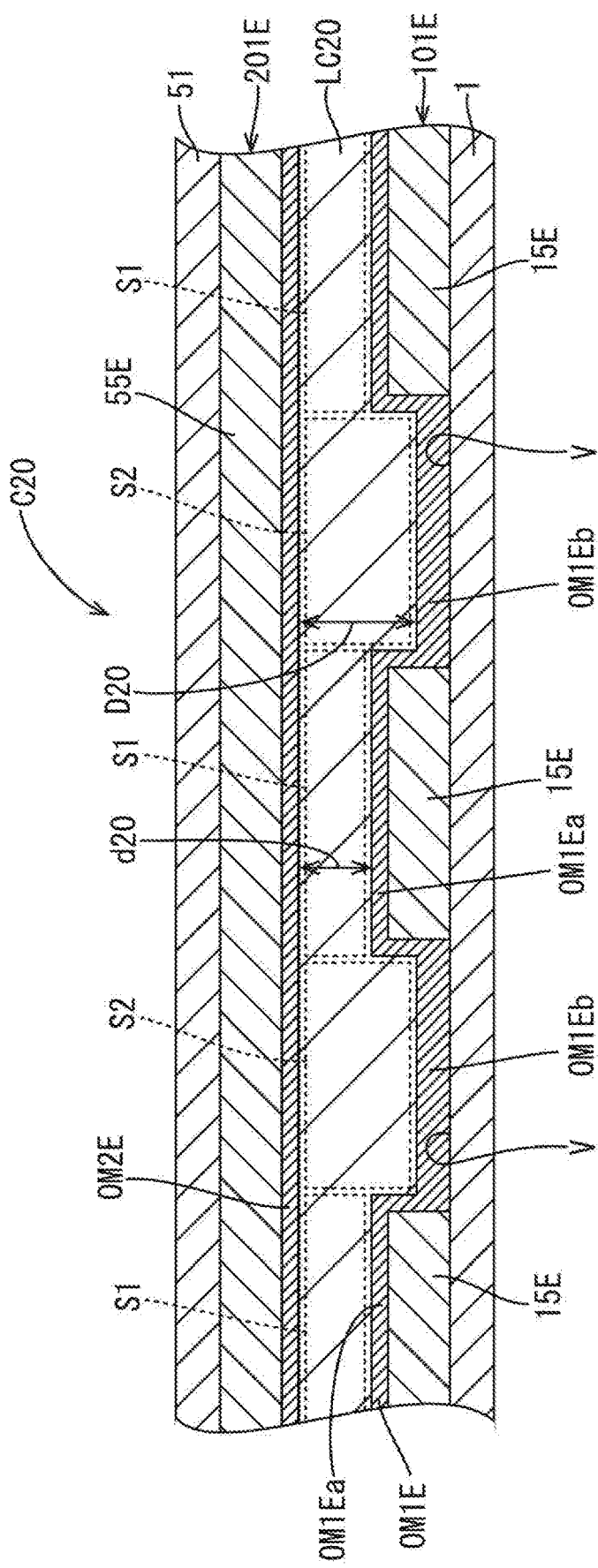
FIG. 17 is a cross-sectional view schematically showing a configuration of a liquid crystal cell of Example 20.

A liquid crystal cell C20 having a configuration shown in FIG. 17 was produced by the method shown below. First, a

TABLE 4

| | | | LIQUID CRYSTAL MATERIAL | | | | | |
|---|---|---|---|---|---|---|---|---|
| | | | | NEMATIC PHASE | | | | |
| | FINAL BAKING TEMPERATURE (° C.) | IMDIZATION RATIO OF ALIGNMENT FILM (%) | Δε | LOWER LIMIT TEMPERATURE T1 (° C.) | UPPER LIMIT TEMPERATURE T2 (° C.) | TEMPERATURE RANGE (° C.) | HIGH-LOW TEMPERATURE CYCLE TEST | | |
| | | | | | | | 500 TIMES | 1000 TIMES | 2000 TIMES |
| EXAMPLE 16 | 160 | 45 | 20 | −40 | 110 | 150 | ○ | ○ | ○ |
| EXAMPLE 17 | 185 | 50 | 20 | −40 | 110 | 150 | ○ | ○ | ○ |
| EXAMPLE 18 | 200 | 78 | 20 | −40 | 110 | 150 | ○ | ○ | x (1700) |
| EXAMPLE 19 | 230 | 91 | 20 | −40 | 110 | 150 | ○ | ○ | x (1190) |
| COMPARATIVE EXAMPLE 5 | 260 | 96 | 20 | −40 | 110 | 150 | ○ | x (980) | x |

As shown in Table 4, the liquid crystal cells of Examples 16 to 19 have the imidization ratio of 45 to 91%. In the above liquid crystal cells of Examples 16 to 19, the visible air bubbles were not generated even after 1000 times of the high-low temperature cycle test. It can be said that the liquid crystal cell is the one in which the generation of air bubbles is suppressed and which has no problem in the actual use. In particular, in the liquid crystal cells of Examples 16, 17

TFT substrate 101E having the same basic configuration as the above-described TFT substrate 101 and a slot substrate 201E having the same basic configuration as the slot substrate 201 were respectively prepared. Patch electrodes 15E of the TFT substrate 101C and a slot electrode 55E of the slot substrate 201E are made of Cu, respectively, and their thicknesses are both set to 3.3 μm. Next, a horizontal alignment film OM1E made of a polyimide-based resin having the imidization ratio of 85% or greater similarly to Example 1 was formed so as to cover the patch electrodes 15E, and a horizontal alignment film OM2E made of a polyimide-based resin having the imidization ratio of 85% or greater also similarly to Example 1 was formed so as to cover the slot electrode 55E. Each of the horizontal alignment films OM1E, OM2E was subjected to the alignment treatment by the rubbing treatment as in Example 1.

The thickness of the horizontal alignment film OM1E is set such that a horizontal alignment film OM1Ea in a portion covering a surface of the patch electrodes 15E is 30 nm, and a horizontal alignment film OM1Eb in a portion covering a groove part V between the patch electrodes 15E is 300 nm (ratio of thickness of thin portion to thick portion of alignment film is 1:10). In addition, the thickness of the horizontal alignment film OM2E (the thickness of the surface portion other than slots) is set to 30 nm.

The TFT substrate 101E and the slot substrate 201E after the alignment treatment were caused to adhere together using sealing material with a predetermined photo spacer interposed therebetween, such that a distance d20 (that is, the thickness of a liquid crystal layer LC20 in the first region S1) between the horizontal alignment film OM1Ea on the patch electrodes 15E and the horizontal alignment film OM2E on the opposing slot electrode 55E (excluding the slots) became 3.5 μm. A thickness D20 of the liquid crystal layer LC20 in the second region S2 is 4.1 μm. Subsequently, liquid crystal material similar to that of Example 4 containing the isothiocyanate group-containing liquid crystal compound shown in the above chemical formula (1) was injected between the two substrates 101E, 201E by the vacuum injection method, and then an injection port was sealed and the like, whereby the liquid crystal cell C20 of Example 20 was obtained.

Examples 21, 22, and Comparative Example 6

Liquid crystal cells of Examples 21, 22, and Comparative Example 6 were produced in the same manner as in Example 20 except that the thickness of the thick portion of the horizontal alignment film OM1E formed on the TFT substrate 101E (thickness at a portion of the horizontal alignment film OM1Eb covering the groove part V between the patch electrodes 15E) was changed to those shown in Table 5. The thickness of the thin portion of the horizontal alignment film OM1E formed on the TFT substrate 101E (portion of the horizontal alignment film OM1Ea covering the surface of the patch electrodes 15E) is set to 30 nm as in Example 20 for all of the above Examples.

High-Low Temperature Cycle Test

The high-low temperature cycle test similar to that of Example 1 was performed on each of the liquid crystal cells of Examples 21, 22, and Comparative Example 6. The results are shown in Table 5.

TABLE 5

| | | | | LIQUID CRYSTAL MATERIAL | | | | | |
| --- | --- | --- | --- | --- | --- | --- | --- | --- | --- |
| | | | | | NEMATIC PHASE | | | | |
| | THICKNESS OF ALIGNMENT FILM AT THIN PORTION (nm) | THICKNESS OF ALIGNMENT FILM AT THICK PORTION (nm) | THICKNESS RATIO OF ALIGNMENT FILM | Δε | LOWER LIMIT TEMPERATURE T1 (° C.) | UPPER LIMIT TEMPERATURE T2 (° C.) | TEMPERATURE RANGE (° C.) | HIGH-LOW TEMPERATURE CYCLE TEST | | |
| | | | | | | | | 500 TIMES | 1000 TIMES | 2000 TIMES |
| EXAMPLE 20 | 30 | 300 | 1:10 | 20 | −40 | 110 | 150 | ○ | ○ | x (1730) |
| EXAMPLE 21 | 30 | 150 | 1:5 | 20 | −40 | 110 | 150 | ○ | ○ | x (1190) |
| EXAMPLE 22 | 30 | 60 | 1:2 | 20 | −40 | 110 | 150 | ○ | ○ | x (1040) |
| COMPARATIVE EXAMPLE 6 | 30 | 300 | 1:1 | 20 | −40 | 110 | 150 | ○ | x (910) | x |

As shown in Table 5, it has been confirmed that when the thickness of the horizontal alignment film OM1Eb in the groove part V of the TFT substrate 101E (alignment film in the thick portion) increases with respect to the thickness of the horizontal alignment film OM1Ea at a portion covering the surface of the patch electrode 15E (alignment film in the thin portion), the air bubbles are not easily generated. It is assumed that when the thickness of the alignment film is increased, the air bubbles (latent air bubbles) latently present in the liquid crystal layer LC20 are taken into the inside of the alignment film. It is presumed that when the latent air bubbles are taken into the inside of the alignment film, the latent air bubbles present in the first region S1 in which the thickness of the liquid crystal layer is small move to the groove part V between the patch electrodes 15E and further into the alignment film OM1Eb of the groove part V. It is presumed that the amount of latent air bubbles present in the liquid crystal layer LC20 is substantially reduced by the latent air bubbles being repeatedly taken in.

As shown in Table 5, in the liquid crystal cells of Examples 20 to 22, the visible air bubbles were generated in the 1730th, 1190th, and 1040th high-low temperature cycle test, respectively. In the liquid crystal cell of Comparative Example 6, the visible air bubbles were generated in the 910th high-low temperature cycle test.

EXPLANATION OF SYMBOLS

1: Dielectric substrate (First dielectric substrate)
3: Gate electrode
4: Gate insulating layer
5: Semiconductor layer
6D: Drain contact layer
6S: Source contact layer 7D: Drain electrode
7S: Source electrode
10: TFT
11: First insulating layer
15: Patch electrode
17: Second insulating layer
51: Dielectric substrate (Second dielectric substrate)
55: Slot electrode
55L: Lower layer
55M: Main layer
55U: Upper layer
57: Slot
57U: Slot electrode unit
58: Third insulating layer
70: Power feed device
72: Power feed pin
101: TFT substrate
201: Slot substrate
1000: Scanning antenna
U: Antenna unit (Antenna unit region)
CH1: Contact hole
LC: Liquid crystal layer
C: Liquid crystal cell
GD: Gate driver
GL: Gate bus line
GT: Gate terminal part
SD: Source driver
SL: Source bus line
ST: Source terminal part
PT: Transfer terminal part
R1: Transmission/reception region
R2: Non-transmission/reception region
Rs: Seal region
S: Sealing material
OM, OM1, OM2: Alignment film

The invention claimed is:

1. A liquid crystal cell in which a plurality of antenna units are arranged, comprising:
a TFT substrate including a first dielectric substrate, a plurality of TFTs supported by the first dielectric substrate and a plurality of patch electrodes electrically connected to the TFTs, and a first alignment film formed to cover a groove part between the patch electrodes adjacent to each other;
a slot substrate including a second dielectric substrate, a slot electrode including a plurality of slots and supported by the second dielectric substrate, and a second alignment film formed to cover the slot electrode; and
a liquid crystal layer sandwiched between the TFT substrate and the slot substrate in which the patch electrodes and the slot electrode are arranged to face each other,
wherein the liquid crystal layer is constituted of liquid crystal material having a lower limit temperature T1 of a nematic phase of the liquid crystal material in a range from −43° C. to −32° C., and an upper limit temperature T2 of the nematic phase of the liquid crystal material in a range from 110° C. to 143° C.,
the liquid crystal layer includes the first region located between each of the patch electrodes and the slot electrode and having small thickness, and the second region located between the groove part and the slot electrode and having large thickness, and
the first alignment film has a thickness at a portion in contact with the liquid crystal layer in the second region in a range from twice to 10 times greater than a thickness at a portion in contact with the liquid crystal layer in the first region.

2. The liquid crystal cell according to claim 1, wherein the liquid crystal layer includes a first region located between each of the patch electrodes and the slot electrode and having small thickness, and a second region located between the groove part and the slot electrode and having large thickness, and
the liquid crystal layer has a difference (D−d) between a thickness d of the liquid crystal layer in the first region and a thickness D of the liquid crystal layer in the second region in a range from 0.2 μm to 10.0 μm.

3. The liquid crystal cell according to claim 1, Wherein the liquid crystal material has a temperature width of the nematic phase in a range from 150° C. to 183° C.

4. The liquid crystal cell according to claim 1, Wherein the liquid crystal material has the temperature width of the nematic phase in a range from 160° C. to 183° C.

5. The liquid crystal cell according to claim 1, wherein the liquid crystal material as an absolute value of dielectric constant anisotropy (Δε) in a range from 15 to 25.

6. The liquid crystal cell according to claim 2, wherein the liquid crystal layer includes the first region located between each of the patch electrodes and the slot electrode and having small thickness, and the second region located between the groove part and the slot electrode and having large thickness, and
the liquid crystal layer has the thickness in the first region in a range from 2.5 μm to 5.5 μm.

7. The liquid crystal cell according to claim 6, wherein the liquid crystal material includes a liquid crystal compound including an isothiocyanate group.

8. The liquid crystal cell according to claim 7, wherein the liquid crystal compound comprises an isothiocyanate group-containing liquid crystal compound represented by the following chemical formula (1),

[CH 1]

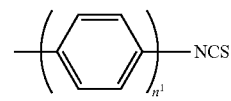

(1)

where n1 is an integer of 1 to 5, and H in a phenylene group may be substituted by F or Cl.

9. The liquid crystal cell according to claim 1, wherein the first alignment film and the second alignment film comprise a polyimide-based resin.

10. The liquid crystal cell according to claim 9, wherein the polyimide-based resin has an imidization ratio in a range from 40% to 95%.

11. A scanning antenna comprising:
the liquid crystal cell according to claim 1; and
a reflective conductive plate arranged to face an outer main surface of the second dielectric substrate of the liquid crystal cell, with a dielectric layer interposed between the reflective conductive plate and the second dielectric substrate.

* * * * *